(12) United States Patent
Tamayama

(10) Patent No.: US 7,500,615 B2
(45) Date of Patent: Mar. 10, 2009

(54) DISPLAY APPARATUS, COMMUNICATION SYSTEM, AND COMMUNICATION METHOD

(75) Inventor: Takeru Tamayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 11/211,789

(22) Filed: Aug. 25, 2005

(65) Prior Publication Data

US 2006/0071076 A1 Apr. 6, 2006

(30) Foreign Application Priority Data

Aug. 27, 2004 (JP) ............................ P2004-247740

(51) Int. Cl.
*G06K 7/10* (2006.01)
(52) U.S. Cl. .................. 235/472.01; 235/375; 235/459; 235/462.01; 235/462.09; 345/76; 345/81; 345/82; 345/87; 345/102
(58) Field of Classification Search ............ 235/472.01, 235/459, 462.09, 462.01, 375; 345/76, 81, 345/82, 87, 102
See application file for complete search history.

(56) References Cited

U.S. PATENT DOCUMENTS

| | | | |
|---|---|---|---|
| 6,327,395 B1 * | 12/2001 | Hecht et al. ................. | 382/306 |
| 7,190,336 B2 * | 3/2007 | Fujisawa ..................... | 345/81 |
| 7,328,846 B2 * | 2/2008 | Harada ....................... | 235/459 |
| 2003/0160817 A1 * | 8/2003 | Ishida et al. ................ | 345/738 |
| 2003/0198928 A1 * | 10/2003 | Lynch et al. ................ | 434/317 |
| 2004/0070620 A1 * | 4/2004 | Fujisawa .................... | 345/764 |
| 2004/0124243 A1 * | 7/2004 | Gatto et al. ................. | 235/487 |

* cited by examiner

*Primary Examiner*—Allyson N Trail
(74) *Attorney, Agent, or Firm*—Sonnenschein Nath & Rosenthal LLP

(57) ABSTRACT

A highly reliable display apparatus, a highly reliable communication system, and a highly reliable communication method capable of performing delivery of high capacity information surely are provided. A display apparatus and an input and output terminal respectively include a light-receiving-emitting section capable of displaying moving pictures and receiving light. The input and output terminal sequentially displays each symbol composing a two-dimensional dynamic code on the light-receiving-emitting section. The display apparatus reads each symbol by the light-receiving-emitting section, acquires symbol-transmission-receiving-status information based on the read symbol, determines display conditions based on the symbol-transmission-receiving-status information, and then displays each symbol of the two-dimensional dynamic code based on the display conditions. By displaying in the aspect, in which the light-receiving-emitting section of the input and output terminal, the receiver can surely reads, contents data can be surely transmitted and received between the display apparatus and the input and output terminal.

15 Claims, 17 Drawing Sheets

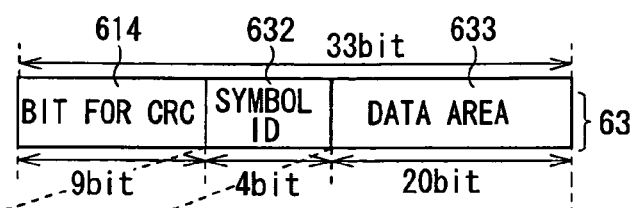

DISPLAY APPARATUS, COMMUNICATION SYSTEM, AND COMMUNICATION METHOD

CROSS REFERENCES TO RELATED APPLICATIONS

The present invention contains subject matter related to Japanese Patent Application JP 2004-247740 filed in the Japanese Patent Office on Aug. 27, 2004, the entire contents of which being incorporated herein by reference.

BACKGROUND OF THE INVENTION

1. Field of the Invention

The present invention relates to a display apparatus, a communication system, and a communication method including a function to transmit information to other apparatus through a display screen.

2. Description of the Related Art

Traditionally, there have been techniques dealing with barcodes, two-dimensional codes and the like. Such techniques are mainly utilized for logistics and the like.

In the techniques using the two-dimensional code, various formats are suggested and utilized. However, since these techniques are all intended for static articles such as printed matters, a usable information capacity is about several K bytes at maximum, and it is difficult to deal with high capacity information. Therefore, the applicants of the present invention have suggested a technique for displaying a plurality of two-dimensional codes sequentially and dynamically and detecting the plurality of two-dimensional codes sequentially and dynamically, for example, in Japanese Unexamined Patent Application Publication No. 2004-127272. According to such a technique, transmitting high capacity information may be possibly realized.

SUMMARY OF THE INVENTION

However, in the technique of the foregoing Japanese Unexamined Patent Application Publication No. 2004-127272, regarding a method of transmitting information between other information processing apparatus, only the conceptual contents as shown in FIG. 7 of the Publication are suggested, and specific contents are not clarified. Therefore, when transmitting high capacity information is actually performed between other information processing apparatus, there is no guarantee that transmitting information can be performed effectively and surely.

As above, in the related art, it has been difficult to transmit high capacity information surely while securing effectiveness, and there is room for improvement.

In view of the foregoing, it is desirable to provide a highly reliable display apparatus, a highly reliable communication system, and a highly reliable communication method capable of transmitting high capacity information surely and effectively through dynamic display and detection of a two-dimensional code.

According to an embodiment of the present invention, there is provided a communication method, in which in one display apparatus, a plurality of symbols composing a two-dimensional dynamic code are sequentially displayed on a first light-receiving-emitting screen along the time axis, and in other display apparatus, the plurality of symbols are read by a second light-receiving-emitting screen, based on the read symbol, symbol-transmission-receiving-status information is acquired, the symbol-transmission-receiving-status information including at least one of information showing a relative angle between the second light-receiving-emitting screen and the first light-receiving-emitting screen, information showing a size of the symbol displayed on the first light-receiving-emitting screen, and information showing a light receiving position of the read symbol, based on the symbol-transmission-receiving-status information, at least one of display conditions is determined, the display conditions including a display angle, a size, and a display position of the symbol in displaying the two-dimensional dynamic code on the second light-receiving-emitting screen, and based on the determined display condition, the two-dimensional dynamic code is displayed on the second light-receiving-emitting screen.

Here, "two-dimensional dynamic code" means code information composed of a series of two-dimensional codes, which changes along the time axis. Here, "two-dimensional code" means a symbol having contents static at each time point. The configuration and meaning contents thereof are previously specified according to a given format. Barcode is a special aspect of two-dimensional codes. Further, "symbol" means an image pattern configured by arranging, for example, a plurality of display elements. In general, such a symbol as an image pattern is formed by setting optical physical quantities such as brightness and color for every display element.

Further, "symbol-transmission-receiving-status information" means, for example, as described above, a transmission-receiving-status for the symbol read on the light-receiving-emitting screen such as a size of symbol, a light receiving position, and a relative angle between two light-receiving-emitting screens (relative angle of the symbol), and shows a spatial arrangement between light-receiving-emitting screens (for example, distance, position, angle and the like). In this case, the light receiving position means a position in the second light-receiving-emitting screen. The relative angle means a rotational angle between two light-receiving-emitting screens. Here, it is possible that each symbol composing the two-dimensional dynamic code includes a plurality of reference elements, and in the other display apparatus, the symbol-transmission-receiving-status information is acquired based on the light receiving position of the reference elements in each symbol. "Reference element" means a specific element enabling acquisition of the foregoing symbol-transmission-receiving-status information, and is to be previously set to a given position in the symbol.

Further, "display conditions" mean, for example, as described above, conditions such as a size, a display position, and a display angle in displaying symbols. The display conditions are determined to become appropriate conditions to the spatial arrangement between light-receiving-emitting screens based on the symbol-transmission-receiving-status information. Then, it is preferable that the display conditions are determined by considering flexibility of position deviance from the light receiving position of the read symbol, flexibility of angle deviance from the relative angle between the second light-receiving-emitting screen and the first light-receiving-emitting screen and the like. Here, "flexibility of position deviance" means a margin in a parallel direction to the light receiving position, which is provided on the assumption that the light receiving position of the symbol is deviated by parallel shift to the target light receiving position (for example, registered coordinates of the light receiving position). Further, similarly, "flexibility of angle deviance" means a margin of rotational shift to the light receiving position, which is provided on the assumption that the light receiving position of the symbol is deviated by rotational shift to the target light receiving position. When display conditions are determined by considering such flexibilities, displaying and reading symbols can be further surely and effectively performed.

Further, it is possible that the plurality of symbols composing the two-dimensional dynamic code include a data symbol which is a two-dimensional code expressed by a format for data transmission and an anchor symbol which is a two-dimensional code expressed by a format for anchor transmission; in one display apparatus, the data symbol is displayed on a first light-receiving-emitting screen along the time axis, and the anchor symbol is displayed on the first light-receiving-emitting screen every time the data symbol is displayed once or a plurality of times; and in other display apparatus, the data symbol and the anchor symbol are read by a second light-receiving-emitting screen, while the anchor symbol is therefrom detected, and the symbol-transmission-receiving-status information is acquired based on the detected anchor symbol. Here, "once or a plurality of times" does not necessarily mean a constant number of times. The number of times of the data symbols displayed between each anchor symbol may be different from each other. It is possible that the format for anchor transmission is configured so that the anchor symbol includes a plurality of reference elements, and in other display apparatus, the symbol-transmission-receiving-status information is acquired based on the light receiving position of the reference element in the anchor symbol.

According to an embodiment of the present invention, there is provided a display apparatus including: a second light-receiving-emitting screen capable of displaying moving pictures and receiving light; a reading control means for reading a plurality of symbols composing the two-dimensional dynamic code displayed on a first light-receiving-emitting screen from the first light-receiving-emitting screen of other one display apparatus by using the second light-receiving-emitting screen; an acquisition means for acquiring symbol-transmission-receiving-status information including at least one of information showing a relative angle between the second light-receiving-emitting screen and the first light-receiving-emitting screen, information showing a size of the symbol shown on the first light-receiving-emitting screen, and information showing a light receiving position of the symbol read by the reading control means, based on the symbol read by the reading control means; a determination means for determining at least one display condition of a display angle, a size, and a display position of the symbol in displaying the two-dimensional dynamic code on the second light-receiving-emitting screen based on the symbol-transmission-receiving-status information acquired by the acquisition means; a generation means for generating the two-dimensional dynamic code including a plurality of symbols; and a display control means for sequentially displaying the plurality of symbols in the two-dimensional dynamic code generated by the generation means along the time axis on the second light-receiving-emitting screen based on the display conditions determined by the determination means.

According to an embodiment of the present invention, there is provided a communication system, in which one display apparatus includes: a first light-receiving-emitting screen capable of displaying moving pictures and receiving light; a first generation means for generating a two-dimensional dynamic code including a plurality of symbols; and a first display control means for sequentially displaying the plurality of symbols in the two-dimensional dynamic code generated by the first generation means along the time axis on the first light-receiving-emitting screen, and other display apparatus includes: a second light-receiving-emitting screen capable of displaying moving pictures and receiving light; a reading control means for reading the plurality of symbols composing the two-dimensional dynamic code displayed on the first light-receiving-emitting screen from the first light-receiving-emitting screen of the one display apparatus by using the second light-receiving-emitting screen; an acquisition means for acquiring symbol-transmission-receiving-status information including at least one of information showing a relative angle between the second light-receiving-emitting screen and the first light-receiving-emitting screen, information showing a size of the symbol shown on the first light-receiving-emitting screen, and information showing a light receiving position of the read symbol based on the symbol read by the reading control means; a determination means for determining at least one display condition of a display angle, a size, and a display position of the symbol in displaying the two-dimensional dynamic code on the second light-receiving-emitting screen based on the symbol-transmission-receiving-status information acquired by the acquisition means; a second generation means for generating the two-dimensional dynamic code including a plurality of symbols; and a second display control means for sequentially displaying the plurality of symbols in the two-dimensional dynamic code generated by the second generation means along the time axis on the second light-receiving-emitting screen based on the display conditions determined by the determination means.

In the communication method or the communication system according to the embodiment of the present invention, in the one display apparatus, the plurality of symbols composing the two-dimensional dynamic code are sequentially displayed on the first light-receiving-emitting screen along the time axis. Further, in the other display apparatus, the plurality of symbols are read by the second light-receiving-emitting screen, and the symbol-transmission-receiving-status information is acquired based on the read symbol. Further, the display conditions are determined based on the symbol-transmission-receiving-status information. Based on the determined display conditions, the two-dimensional dynamic code is displayed on the second light-receiving-emitting screen. Therefore, each symbol of the two-dimensional dynamic code is displayed in the aspect surely readable on the first light-receiving-emitting screen in one display apparatus.

In the display apparatus according to the embodiment of the present invention, the plurality of symbols composing the two-dimensional dynamic code displayed on the first light-receiving-emitting screen of the other one display apparatus are read from the first light-receiving-emitting screen of the other one display apparatus by using the second light-receiving-emitting screen. Further, based on the read symbol, the symbol-transmission-receiving-status information is acquired. Further, based on the acquired symbol-transmission-receiving-status information, the display conditions are determined. Based on the determined display conditions, the two-dimensional dynamic code is sequentially displayed on the second light-receiving-emitting screen. Therefore, each symbol of the two-dimensional dynamic code is displayed in the aspect, in which each symbol can be surely read at the first light-receiving-emitting screen in the other one display apparatus.

According to the communication method or the communication system of the embodiment of the present invention, in the one display apparatus, the plurality of symbols composing the two-dimensional dynamic code are sequentially displayed, and in the other display apparatus, the plurality of symbols are read, the symbol-transmission-receiving-status information is acquired, the display conditions are determined based on the symbol-transmission-receiving-status information, and the two-dimensional dynamic code is displayed based on the display conditions. Therefore, high capacity information can be surely and effectively transmitted.

According to the display apparatus of the embodiment of the present invention, the plurality of symbols composing the two-dimensional dynamic code are read from the other one display apparatus, the symbol-transmission-receiving-status information is acquired, the display conditions are determined based on the symbol-transmission-receiving-status information, and the two-dimensional dynamic code is displayed based on the display conditions. Therefore, high capacity information can be surely and effectively transmitted.

Other and further objects, features and advantages of the invention will appear more fully from the following description.

BRIEF DESCRIPTION OF THE DRAWINGS

FIGS. 17A and 17B are models showing an example of a data configuration in the symbol of FIGS. 16A and 16B.

DETAILED DESCRIPTION OF THE PREFERRED EMBODIMENT

A best mode for carrying out the present invention (hereinafter simply referred to embodiment) will be hereinafter described in detail with reference to the drawings. A communication method according to an embodiment of the present invention is embodied by a communication system according to this embodiment, and therefore descriptions thereof will be given together.

Figure 1:
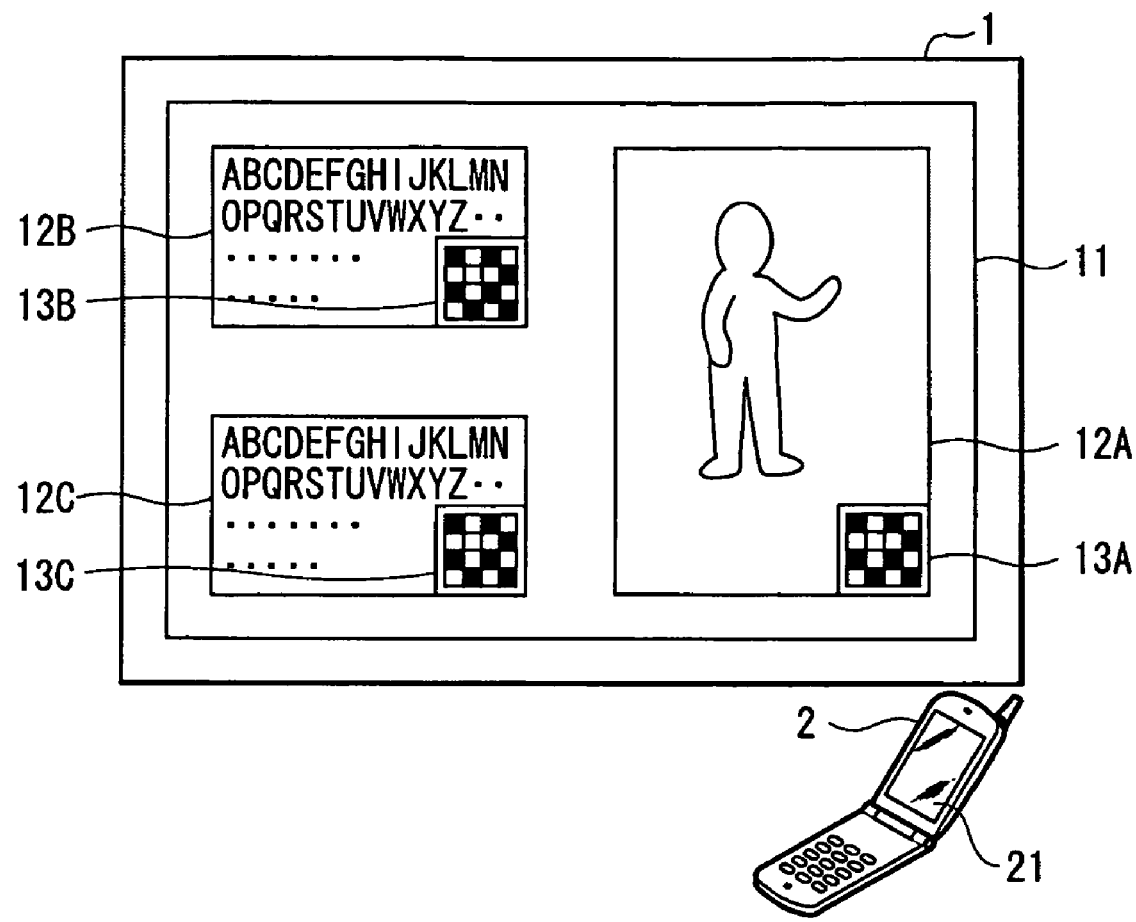
FIG. 1 is a block diagram showing a whole configuration of a communication system according to an embodiment of the present invention.

FIG. 1 shows a whole configuration of a communication system according to an embodiment of the present invention. The communication system includes a display apparatus 1 having a function to display moving pictures of given figures, texts and the like, and an input and output terminal 2 having a function to input and output given information. Here, the display apparatus 1 is composed of, for example, a TV apparatus, and the input and output terminal 2 is composed of, for example, a mobile phone. However, the display apparatus 1 and the input and output terminal 2 may be configured to have other types of apparatuses (for example, CD (Compact Disc: registered trademark) player, personal computer or the like) as long as these functions are included.

Here, the display apparatus 1 and the input and output terminal 2 in this embodiment respectively correspond to specific examples of "other display apparatus" and "one display apparatus" in the present invention.

The display apparatus 1 includes a light-receiving-emitting section 11 including, for example, an organic or inorganic EL (Electroluminescence) display, an LCD (Liquid Crystal Display) or the like, in which a plurality of pixels are arranged in the shape of a matrix over the whole area. Each pixel in the light-receiving-emitting section 11 is configured to have a light-receiving-emitting cell including one light-receiving-emitting device, and each pixel performs light-receiving-emitting operation function. As above, by utilizing light emitting operation and light receiving operation in each pixel to display and read after-mentioned two-dimensional dynamic codes, information can be transmitted and received by using the light-receiving-emitting section 11.

Figure 2:
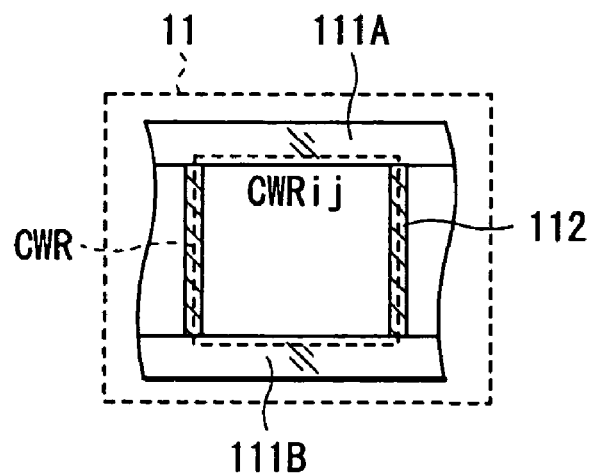
FIG. 2 is a cross section showing a model of an example of an arrangement configuration of a light-receiving-emitting cell in a light-receiving-emitting section of a display apparatus of FIG. 1.

FIG. 2 shows a model of an example of an arrangement configuration of the light-receiving-emitting cell in the light-receiving-emitting section 11 of the display apparatus 1 of FIG. 1 with a cross section. In the example of FIG. 2, the case where the light-receiving-emitting device included in the light-receiving-emitting cell is an organic EL device, and the organic EL layer is provided between a pair of transparent substrates is shown. In this figure, reference symbols i and j indicating the position represent given natural numbers.

The light-receiving-emitting section 11 has a pair of transparent substrates 111A and 111B, and a plurality of light-receiving-emitting cells CWR (CWRij), which are arranged between the transparent substrates 111A and 111B, and separated from each other by a dividing wall 112. Further, in this example, as described above, the light-receiving-emitting cell CWR includes the organic EL device as a light-receiving-emitting device. Other layers in a general organic EL display are not shown and omitted.

The cross section of the arrangement configuration example of the light-receiving-emitting cell CWR in the light-receiving-emitting section 11 according to this embodiment is not limited to the foregoing model, but other arrangement configuration may be adopted. Further, in the example of the cross section shown in FIG. 2, descriptions have been given with reference to the example, in which the light-receiving-emitting device EL is composed of the organic EL device. However, the light-receiving-emitting device may be other device, as long as the device includes a light emitting function and a light receiving function. Further, a combination of a light emitting device and a light receiving device may be arranged. In this case, for example, it is possible to arrange a liquid crystal device as a light emitting device, and arrange a CCD device (Charge-Coupled Devices) as a light receiving device.

Figure 3:
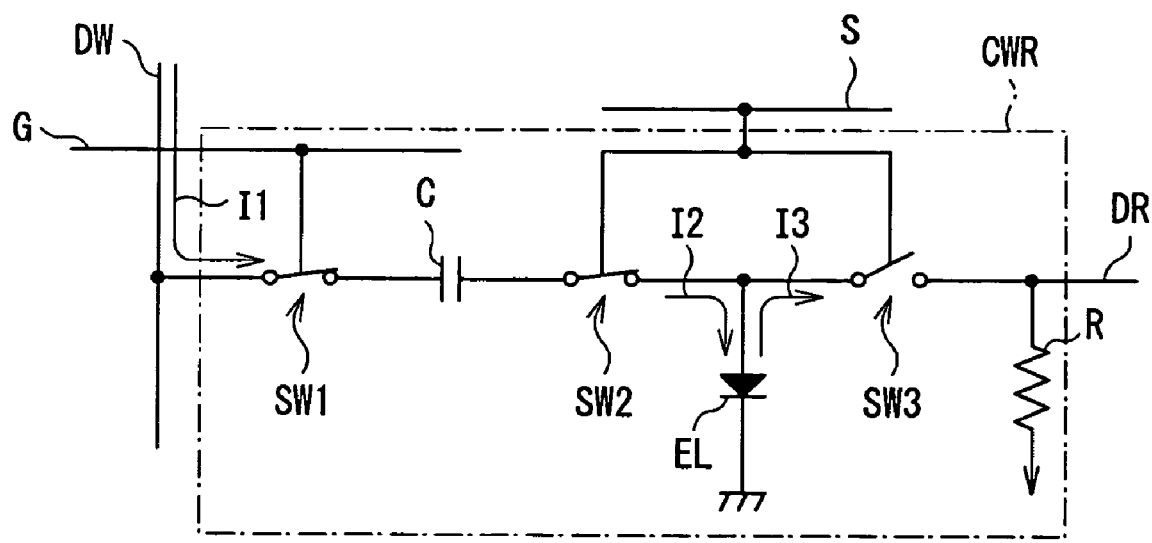
FIG. 3 is a circuit diagram showing a configuration of the light-receiving-emitting cell in FIG. 2.

FIG. 3 shows a circuit configuration of the light-receiving-emitting cell CWR in FIG. 2.

The light-receiving-emitting cell CWR has a configuration in which a gate line for light emitting G for selecting the light-receiving-emitting device EL as a light emitting drive target, a data feed line DW for feeding data for display to the light-receiving-emitting device EL, a switch line S for switching light emitting drive and light receiving drive for the light-receiving-emitting device EL, and a data reading line DR for reading a light receiving signal from the light-receiving-emitting device EL are respectively connected. That is, compared to the cell of 1 pixel including an ordinary light emitting device, in this configuration, one gate line and one data line are additionally included for light receiving. Further, the light-receiving-emitting cell CWR has a light-receiving-emitting device EL, a capacitor C, a resistance R, a first switch SW1, a second switch SW2, and a third switch SW3. The first switch SW1 selectively provides conduction between the data feed line DW and an end of the capacitor C according to a selection signal fed from the gate line for light emitting G. The second switch SW2 selectively provides conduction between the other end of the capacitor and an end of the light-receiving-emitting device EL according to a switch signal fed from the switch line S, and the third switch SW3 selectively provides conduction between an end of the light-receiving-emitting device EL and the data reading line DR according to the switch signal fed from the switch line S. The other end of the light-receiving-emitting device EL is connected to ground. An end of the resistance R is connected to the data reading line DR, and the other end of the resistance R is connected to ground, or connected to a negative bias point (not shown).

Here, descriptions will be specifically and simply given of behavior of the light-receiving-emitting cell during light emitting operation and light receiving operation. Light emitting operation and light receiving operation are preformed by utilizing characteristics of the light-receiving-emitting device EL as follows. That is, in the organic EL device, the LED device or the like configured as a light-receiving-emitting device in the example of the figure, light emitting operation occurs when a forward bias voltage is applied, and light receiving occurs to generate a current when a backward bias voltage is applied. Therefore, the light-receiving-emitting device EL is not able to perform light emitting operation and light receiving operation concurrently. It is necessary to adopt time division operation for performing both operations.

In light emitting operation, as described above, according to the selection signal fed from the gate line for light emitting G and the switch signal fed from the switch line S, the first switch SW1 and the second switch SW2 become ON state and the third switch SW3 becomes OFF state. Concurrently, a forward bias voltage is applied to the light-receiving-emitting device EL. Here, in order to obtain light emitting with brightness corresponding to the display signal, the capacitor C is charged from the data feed line DW via a path I1, and accordingly a current is applied to the light-receiving-emitting device EL via a path I2, and thereby light emitting operation is performed.

Meanwhile, in light receiving operation, as described above, according to the switch signal fed from the switch line S, the second switch becomes OFF state, and the third switch SW3 becomes ON state. Concurrently, a backward bias voltage is applied to the light-receiving-emitting device EL. A current corresponding to a light volume received in the light-receiving-emitting device EL is provided to the data reading line DR via a path I3, and thereby light receiving operation is performed. When both light emitting operation and light receiving operation are not performed, the first switch SW1, the second switch SW2, and the third switch SW3 are all in OFF state, and the data feed line DW and the data reading line DR are respectively disconnected from the light-receiving-emitting device EL. The resistance R connected to the data reading line DR has a function to generate potential difference between the both ends of the resistance R based on the current provided to the data reading line DR via the path I3 as described above, and to output the potential difference as a light receiving signal.

By controlling as above, each pixel in the light-receiving-emitting section 11 can perform light emitting operation and light receiving operation.

Descriptions will be given with reference to FIG. 1 again.

The display apparatus 1 concurrently displays, for example, a plurality of windows 12A, 12B, and 12C on the screen, and displays given figures, texts and the like in the window. (in this case, a given figure is displayed in the window 12A, and given texts are displayed in the windows 12B and 12C.)

Further, in the respective windows 12A to 12C displayed in the light-receiving-emitting section 11, symbols 13A to 13C are displayed on the bottom right corner of each window. In the symbols 13A to 13C, for example, a plurality of white or black display elements are arranged in a given region. The black and white pattern can be switched for every frame by the light-receiving-emitting section 11. The symbols 13A to 13C compose a two-dimensional dynamic code as the two-dimensional code changing along the time axis as described later. Generally, each display element includes a plurality of light-receiving-emitting cells. Further, the symbols 13A to 13C express various contents data which is the information to be transmitted to the input and output terminal 2 such as information on figures, texts and the like displayed in the respective windows 12A to 12C. By transmitting the contents data to the input and output terminal 2 by using the two-dimensional dynamic code including these symbols, such contents data can be shared with the input and output terminal 2.

In FIG. 1, the respective symbols 13A to 13C are displayed on the bottom right corner of the respective windows 12A to 12C. However, the displayed position is not limited thereto, but the respective symbols 13A to 13C can be displayed in a given position in the light-receiving-emitting section 11. The same is applied to the following figures.

The input and output terminal 2 includes a light-receiving-emitting section 21 configured to have, for example, an organic or inorganic EL display, an LCD or the like as in the display apparatus 1. As described above, by displaying or reading a two-dimensional dynamic code by utilizing the light-receiving-emitting section 21, information can be transmitted and received with the display apparatus 1.

Figure 4:
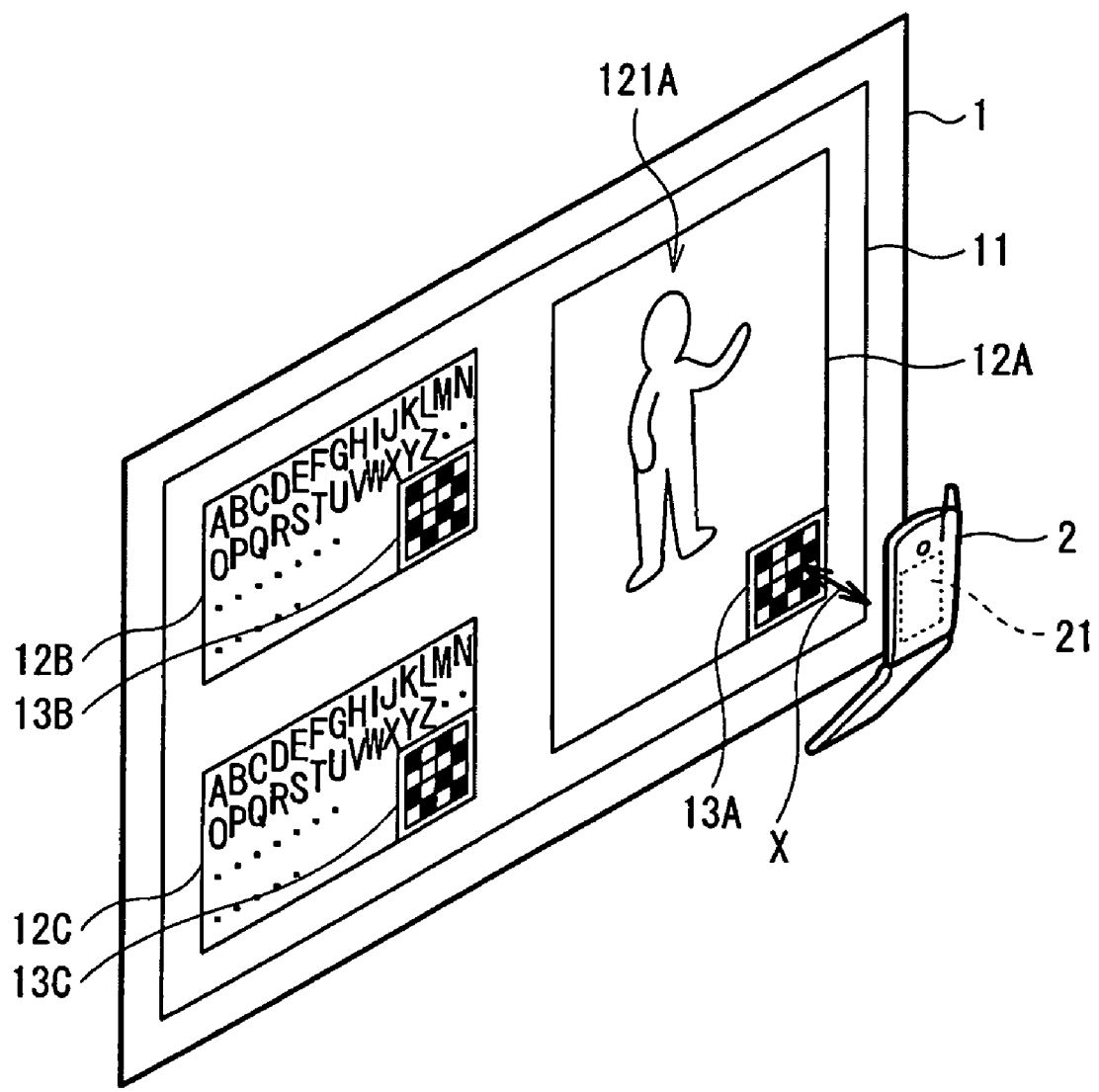
FIG. 4 is a perspective view showing an example of a communication situation using a two-dimensional dynamic code in the communication system of FIG. 1.

FIG. 4 shows an example of communication situation using the two-dimensional dynamic code in the communication system of FIG. 1 by a perspective view.

As shown in FIG. 4, for example, a user approximates the light-receiving-emitting section 21 included in the input and output terminal 2 to the vicinity of the region of the symbol 13A displayed on the light-receiving-emitting section 11 included in the display apparatus 1, and thereby information can be intuitively transmitted and received through the symbol 13A as indicated by arrow X. Thereby, various information can be easily shared between the display apparatus 1 and the input and output terminal 2. Specifically, for example, by transmitting contents data from the display apparatus 1 to the input and output terminal 2 through the symbol 13A, contents displayed in the window 12A where the symbol 13A is located (in the figure, an image 121A) can be easily displayed on the light-receiving-emitting section 21 of the input and output terminal 2.

Figure 5:
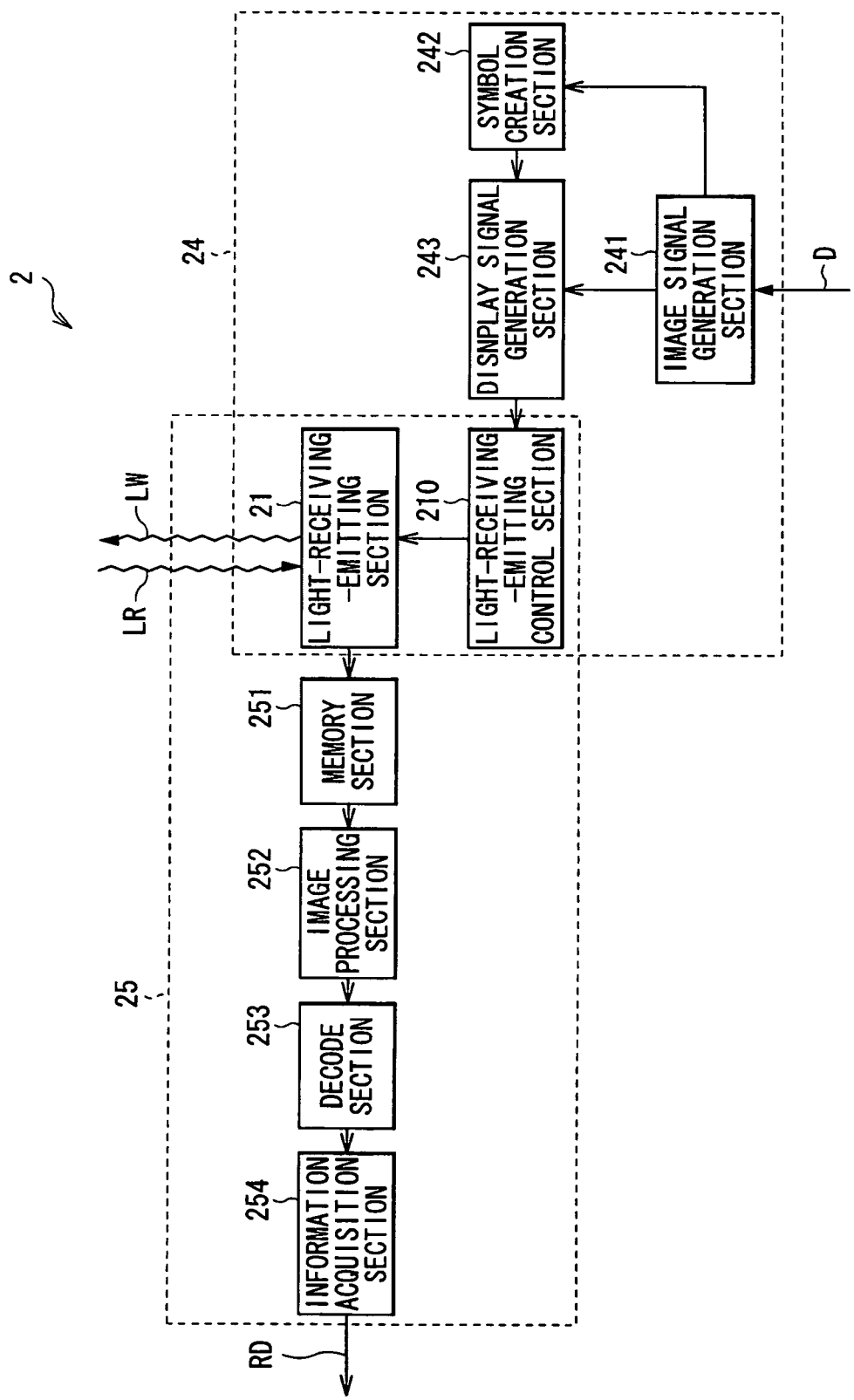
FIG. 5 is a block diagram showing an example of a functional configuration in an input terminal of FIG. 1.

FIG. 5 shows an example of a function configuration in the input and output terminal 2 of FIG. 1. The input and output terminal 2 includes a transmission function section 24 having a function to transmit information using the two-dimensional dynamic code and a receiving function section 25 having a function to receive information using the two-dimensional dynamic code. The transmission function section 24 and the receiving function section 25 are controlled by an unshown control section.

The transmission function section 24 has an image signal generation section 241, a symbol creation section 242, a display signal generation section 243, a light-receiving-emitting control section 210, and the light-receiving-emitting section 21. Meanwhile, the receiving function section 25 has a light-receiving-emitting control section 210, the light-receiving-emitting section 21, a memory section 251, an image processing section 252, a decode section 253, and an information acquisition section 254. That is, as shown in FIG. 5, the light-receiving-emitting control section 210 and the light-receiving-emitting section 21 are common sections for the transmission function section 24 and the receiving function section 25.

First, descriptions will be given of each component of the transmission function section 24.

The image signal generation section 241 generates image signals for performing display, for example, for every screen (every frame to be displayed) based on information such as various contents data D or the like provided from, for example, an unshown TV tuner, a network connection section or the like. The image signal for every screen generated as above is output to the symbol creation section 242 and the display signal generation section 243.

The symbol creation section 242, for example, creates a symbol for every screen configuring the two-dimensional dynamic code based on the image signal for every screen output from the image signal generation section 241. Specifically, for example, the image signal is divided into data for every symbol, header information included in the two-dimensional dynamic code (information included in the after-mentioned header symbol), calculated values of CRC (Cyclic Redundancy Check) and the like are added to the divided data, and the symbol for every screen is created. Then, the created symbol for every screen is output to the display signal generation section 243.

A pattern of the symbol created as above is not necessarily different for every frame. It is possible that one symbol pattern exists for several frames. In this case, the same symbol pattern is to be displayed for several frames. The symbol pattern number per 1 sec will be hereinafter shown in units of "symbols/sec."

The display signal generation section 243 synthesizes the image signal for every screen output from the image signal generation section 241 and the symbol for every screen output from the symbol creation section 242, and generates a display signal for every screen to be displayed on the light-receiving-emitting section 21. The display signal for every screen synthesized as above is output to the light-receiving-emitting control section 210.

The light-receiving-emitting control section 210 performs drive operation for displaying contents and each symbol of the two-dimensional dynamic code corresponding to the display signal on the light-receiving-emitting section 21 based on the display signal output from the display signal generation section 243. Specifically, for example, in the case of linear sequential drive operation generally used, the light-receiving-emitting control section 210 includes a gate driver, a data driver and the like. As described in FIG. 3, a selection signal for selecting each pixel for one horizontal line is fed from the gate driver to the light-receiving-emitting section 21 through the gate line for light emitting G, and at the same time a display signal is fed from the data driver to each pixel for one horizontal line of the light-receiving-emitting section 21 through the data feed line DW. By performing such linear sequential drive operation over the whole horizontal lines of the light-receiving-emitting section 21, contents and each symbol of the two-dimensional dynamic code corresponding to the display signal can be displayed on the light-receiving-emitting section 21.

The light-receiving-emitting section 21 displays contents and each symbol of the two-dimensional dynamic code corresponding to the display signal by, for example, linear sequential drive operation as described above. As above, the light-receiving-emitting section 21 displays various contents themselves and each symbol of the two-dimensional dynamic code created based on the contents data, and thereby information such as contents data can be transmitted to the input and output terminal 2 through a light emitting ray LW.

Next, descriptions will be given of each component of the receiving function section 25.

The light-receiving-emitting section 21 has a function to display contents and each symbol of the two-dimensional dynamic code corresponding to the display signal as described above, and concurrently to receive light. That is, by reading each symbol of the two-dimensional dynamic code displayed on the light-receiving-emitting section 11 in the display apparatus 1 as a light receiving ray LR, information such as contents data can be received.

In this case, the light-receiving-emitting control section 210 performs not only drive operation for displaying on the light-receiving-emitting section 21, but also drive operation for receiving light. Specifically, for example, in the case of the foregoing linear sequential drive operation, as described in FIG. 3, the following operations are performed. That is, a switching signal for switching each pixel for one horizontal line as a light receiving drive target is provided from the gate driver to the light-receiving-emitting section 21 through the switch line S, and at the same time a light receiving signal from each pixel for one horizontal line of the light-receiving-emitting section 21 is obtained through the data reading line DR. By performing such linear sequential drive operation over the whole horizontal lines of the light-receiving-emitting section 21, each symbol of the two-dimensional dynamic code can be read as the light receiving ray LR and the light receiving signal can be obtained in the light-receiving-emitting section 21. The light receiving signal obtained as above is output to the memory section 251 in the receiving function section 25.

The memory section 251 reconstructs the light receiving signal output from the light-receiving-emitting section 21 to a light receiving signal for every screen, and stores and retains the reconstructed light receiving signal in a frame memory composed of, for example, an SRAM (Static Random Access Memory) or the like. The light receiving signal for one screen stored in the memory section 251 is output to the image processing section 252. The memory section 251 may include a memory device other than the memory. For example, data of the light receiving signal can be retained as analog data.

The image processing section 252 performs image processing of the light receiving signal for one screen output from the memory section 251. Specifically, the image processing section 252 extracts each symbol of the two-dimensional dynamic code from the data of the light receiving signal for one screen. As described later, as a method of extracting a symbol, the symbol is extracted by detecting a logo mark or an area for recognition included in each symbol from the position coordinates thereof or the like. The data of each symbol of the two-dimensional dynamic code, which is image-processed and extracted as above is output to the decode section 253.

The decode section 253 decodes the data of each symbol of the two-dimensional dynamic code output from the image processing section 252. Specifically, first, CRC is executed based on the data of each symbol. When error correction is needed in the data in the symbol, error correction of the data in the symbol or error correction of the data of the symbol itself is performed by a given process described later. Then, such data is to be decoded. Then, if the same symbol has been acquired redundantly, such redundant data is not acquired, or is deleted. As above, the data of each symbol is decoded, and the decoded data is output to the information acquisition section 254.

The information acquisition section 254 accumulates the decoded data output from the decode section 253, and restores and acquires receiving data RD such as header information included in each symbol and contents data based on the accumulated decoded data. The receiving data RD restored from each symbol as above is output to the control section (not shown), and the process corresponding to such information is executed. Specifically, for example, as described above, it is possible to execute process that the contents displayed by the apparatus, which transmits the contents data are displayed on the apparatus receiving the contents data.

Figure 6:
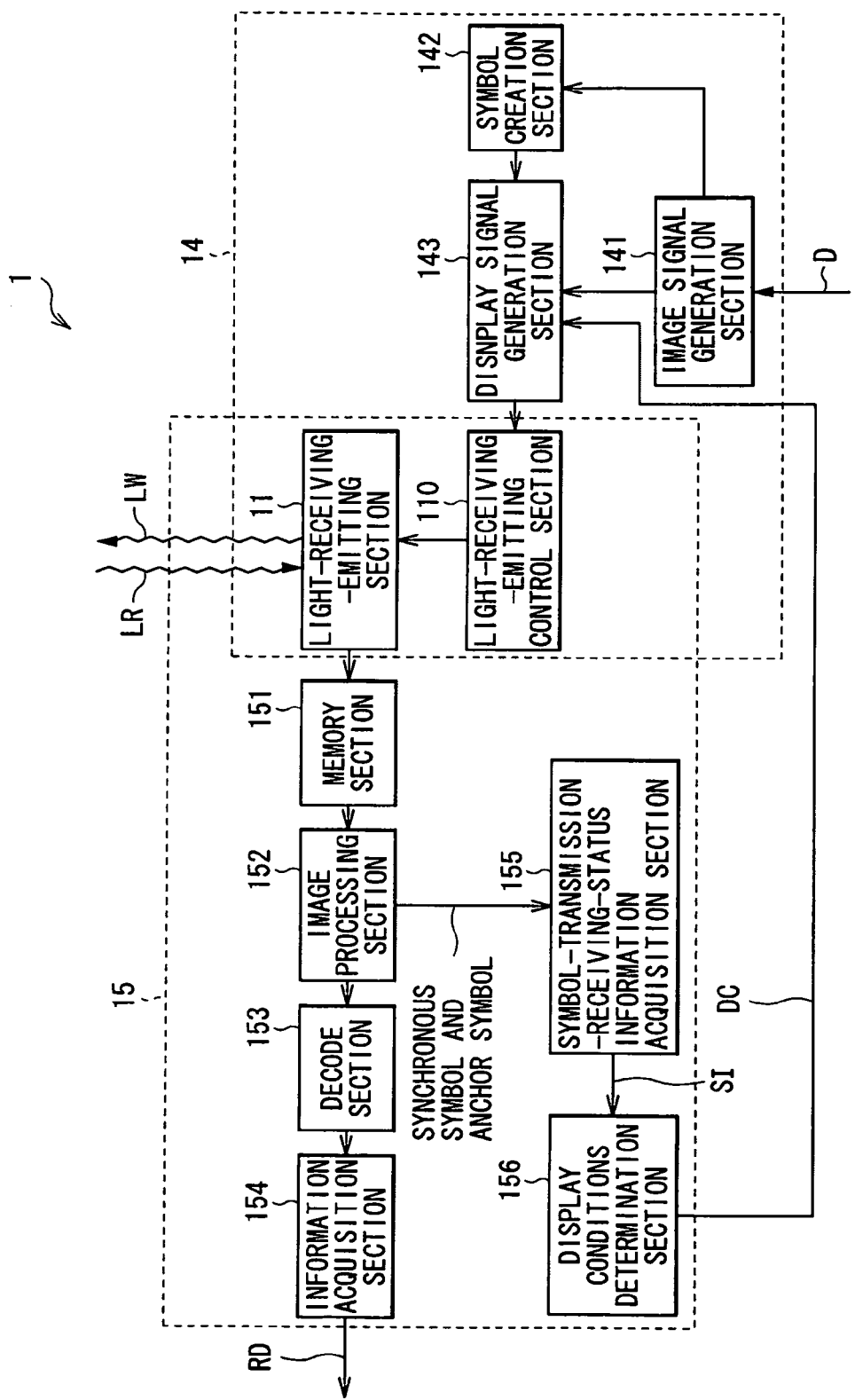
FIG. 6 is a block diagram showing an example of a functional configuration in the display apparatus of FIG. 1.

FIG. 6 shows an example of a function configuration in the display apparatus 1 of FIG. 1. As the input and output terminal 2 shown in FIG. 5, the display apparatus 1 includes a transmission function section 14 having a function to transmit information using the two-dimensional dynamic code and a receiving function section 15 having a function to receive information using the two-dimensional dynamic code. Further, these transmission function section 14 and the receiving function section 15 are controlled by an unshown control section.

The transmission function section 14 has, as the input and output terminal 2 shown in FIG. 5, an image signal generation section 141, a symbol creation section 142, a display signal generation section 143, a light-receiving-emitting control section 110, and the light-receiving-emitting section 11.

Meanwhile, the receiving function section 15 has the light-receiving-emitting control section 110 and the light-receiving-emitting section 11, which are common sections with the transmission function section 14, a memory section 151, an image processing section 152, a decode section 153, an information acquisition section 154, a symbol-transmission-receiving-status information acquisition section 155, and a display conditions determination section 156. That is, compared to the input and output terminal 2 shown in FIG. 5, the display apparatus 1 additionally has the symbol-transmission-receiving-status information acquisition section 155 and the display conditions determination section 156.

Next, descriptions will be given of each component of the receiving function section 15. Since each component of the transmission function section 14 is similar to of the transmission function section 24 of the input and output terminal 2 shown in FIG. 5, the description thereof will be omitted. Since each component of the receiving function section 15 is fundamentally similar to of the receiving function section 25 of the input and output terminal 2, descriptions thereof will be omitted as appropriate.

As described above, the light-receiving-emitting section 11 has a function to display contents and each symbol of the two-dimensional dynamic code corresponding to the display signal and concurrently to receive light. That is, by reading each symbol of the two-dimensional dynamic code displayed on the light-receiving-emitting section 21 in the input and output terminal 2 as the light receiving ray LR, information such as contents data can be received.

The light-receiving-emitting control section 110 performs not only drive operation for displaying on the light-receiving-emitting section 11, but also drive operation for receiving light. The obtained light receiving signal is output to the memory section 151 in the receiving function section 15.

The memory section 151 reconstructs the light receiving signal output from the light-receiving-emitting section 11 to a light receiving signal for every screen, and stores and retains the reconstructed light receiving signal in a frame memory including, for example, an SRAM or the like. The light receiving signal for one screen stored in the memory section 151 is output to the image processing section 152.

The image processing section 152 performs image processing of the light receiving signal for one screen output from the memory section 151. Specifically, as the image processing section 252, the image processing section 152 extracts each symbol of the two-dimensional dynamic code from the data of the light receiving signal for one screen. As described later, as a method of extracting a symbol, the symbol is extracted by detecting a logo mark or an area for recognition included in each symbol from the position coordinates thereof or the like. The data of each symbol of the two-dimensional dynamic code, which is image-processed and extracted as above is output to the decode section 153. Data of a synchronous symbol and an anchor symbol described later is output to the symbol-transmission-receiving-status information acquisition section 155 as well.

The decode section 153 decodes the data of each symbol of the two-dimensional dynamic code output from the image processing section 152. The decoded data is output to the information acquisition section 154.

The information acquisition section 154 accumulates the decoded data output from the decode section 153, and restores and acquires receiving data RD such as header information included in each symbol, contents data, and after-mentioned request information based on the accumulated decoded data. The receiving data RD restored from each symbol as above is output to the control section (not shown), and the process corresponding to such information is executed.

The symbol-transmission-receiving-status information acquisition section 155 calculates and acquires a symbol-transmission-receiving-status information SI based on after-mentioned synchronous symbol data and anchor symbol data output from the image processing section 152. As the symbol-transmission-receiving-status information SI, for example, information showing the relative angle between the light-receiving-emitting section 21 of the input and output terminal 2 and the light-receiving-emitting section 11 of the display apparatus 1, information showing a size of the symbol of the two-dimensional dynamic code shown on the light-receiving-emitting section 21, information showing a light receiving position in the light-receiving-emitting section 11 of the symbol of the two-dimensional dynamic code read by the display apparatus 1 and the like can be cited. For the method of calculating and acquiring such a symbol-transmission-receiving-status information SI, descriptions will be given later. The obtained symbol-transmission-receiving-status information SI is output to the display conditions determination section 156.

The display conditions determination section 156 determines display conditions DC in subsequently displaying a symbol of the two-dimensional dynamic code on the light-receiving-emitting section 11 based on the symbol-transmission-receiving-status information SI output from the symbol-transmission-receiving-status information acquisition section 155. As the display conditions DC, a display angle, a size, a display position and the like of the symbol are cited. For the method of determining such display conditions DC, descriptions will be given later. The determined display conditions DC are output to the display signal generation section 143 of the transmission function section 14. After that, a display signal is generated considering the display conditions DC.

Next, descriptions of the configuration of the two-dimensional dynamic code in this embodiment will be described in detail.

Figure 7A:
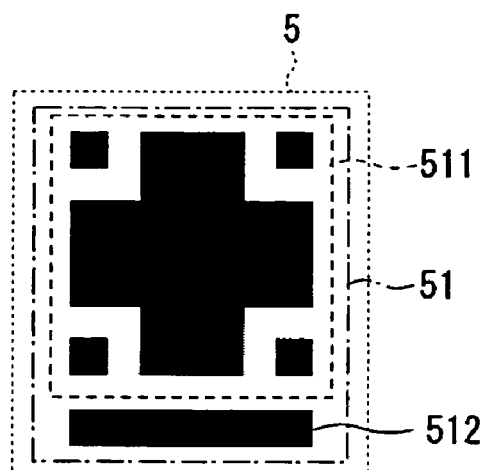
FIGS. 7A, 7B, 7C, and 7D are models showing examples of symbol shapes of the two-dimensional dynamic code.
Figure 7B:
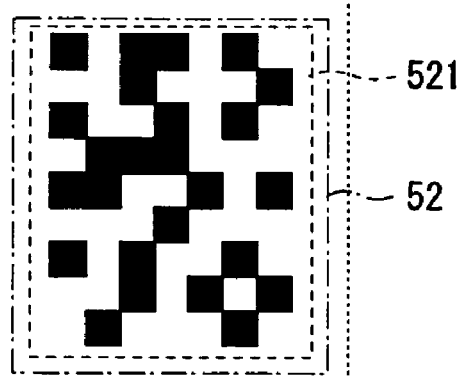
Figure 7C:
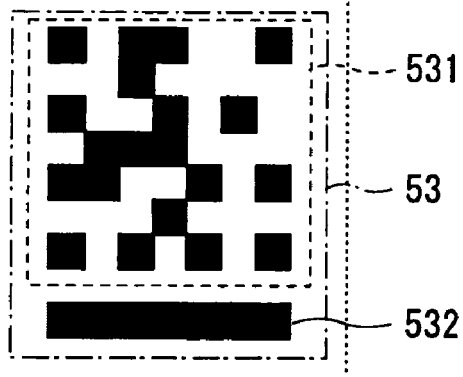
Figure 7D:
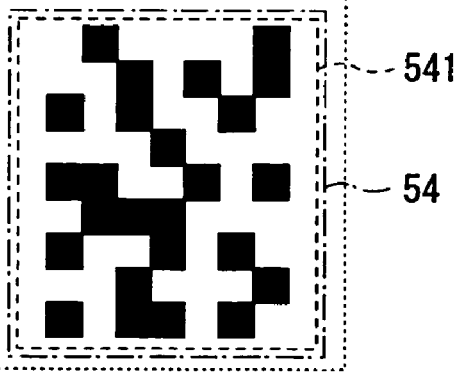

FIGS. 7A, 7B, 7C, and 7D show an example of a shape of a symbol of the two-dimensional dynamic code. A symbol of the two-dimensional dynamic code 5 includes 4 types of symbol shapes. In these figures, FIG. 7A shows a shape of a synchronous symbol 51, FIG. 7B shows a shape of a header symbol 52, FIG. 7C shows a shape of an anchor symbol 53, and FIG. 7D shows a shape of a data symbol 54.

These 4 types of symbols are respectively used for the following purposes. That is, the synchronous symbol 51 is used for recognizing that the synchronous symbol 51 is the forehand symbol in the two-dimensional dynamic code (that is, the synchronous symbol 51 is the start point of the data communication by the two-dimensional dynamic code) and for detecting angles, sizes, and light receiving positions of subsequent respective symbols. The header symbol 52 includes header information, and is used for recognizing such header information. The anchor symbol 53 is used for detecting light receiving positions and angles of respective data symbols. The data symbol 54 is used for data information.

The shape of the synchronous symbol 51 includes a code section 511, in which the total of 49 dots (7×7) of white or black display elements are arranged, and a logo mark section 512 which is the rectangular display element and is arranged under the code section 511. Further, 4 dot regions in the four corners are respectively the areas for recognition described later. Therefore, when the areas for recognition are subtracted from the code section 511 composed of the total of 49 dots, 33 dots (49−4×4) are obtained. Meanwhile, the logo mark section 512 shows a given logo mark of the two-dimensional dynamic code.

The synchronous symbol 51 is used for recognizing that the synchronous symbol 51 is the foremost symbol in the two-dimensional dynamic code and for detecting angles, sizes, and light receiving positions of subsequent respective symbols. Therefore, as the whole symbol, a previously set fixed pattern is typically arranged. A shape of the synchronous symbol 51 is not limited to the shape shown in FIG. 7A, but may be other given shape, as long as it is possible to recognize that the synchronous symbol is the foremost symbol, and detect light receiving positions of respective symbols.

The shape of the header symbol 52 is different from the shape of the synchronous symbol 51 shown in FIG. 7A. The header symbol 52 includes only a code section 521, in which the total of 63 dots (7×9) of white or black display elements are arranged. Further, regarding respective dots in the code section 521, a given black and white pattern is arranged for every symbol. Since there is no area for recognition in the code section 521, the dots for the area for recognition (4×4=16 dots) can be used as a given pattern, and therefore the data capacity thereof is increased compared to of the synchronous symbol 51.

As the shape of the synchronous symbol 51 shown in FIG. 7A, the shape of the anchor symbol 53 includes a code section 531, in which the total of 49 dots (7×7) of white or black display elements are arranged, and a rectangular logo mark section 532, which is arranged under the code section 531. However, regarding respective dots in the code section 531, a given black and white pattern is arranged for every symbol except for the area for recognition. Meanwhile, in the logo mark section 532, a fixed pattern is typically arranged as the shape of the synchronous symbol 51. The area for recognition and the logo mark section 532 as the fixed patterns will be hereinafter referred to as a reference element. As described later, the reference element is utilized for recognizing that the anchor symbol 53 is the anchor symbol and for detecting the angle, the size and the light receiving position of the data symbol 54 in the light-receiving-emitting sections 11 and 21.

As the shape of the header symbol 52 of FIG. 7B, the shape of the data symbol 54 includes only a code section 541, in which the total of 63 dots (7×9) of white or black display elements are arranged. Further, regarding respective dots in the code section 541, a given black and white pattern is arranged for every symbol. As in the shape of the header symbol 52 of FIG. 7B, there is no area for recognition in the code section 541, and the data capacity thereof is increased compared to of the synchronous symbol 51 and the anchor symbol 53.

Figure 8A:
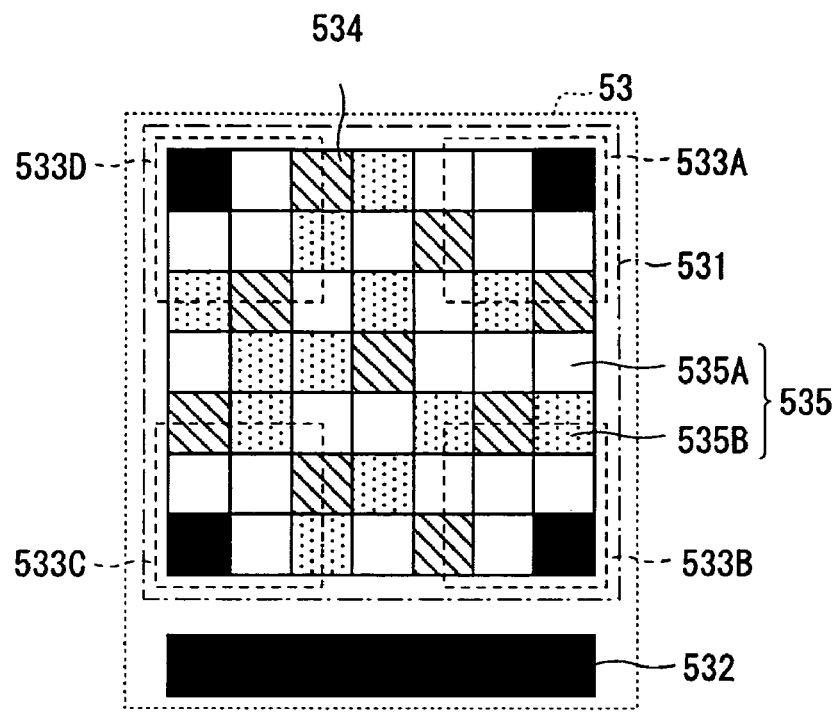
FIGS. 8A and 8B are models showing configurations and functions of each dot in the symbols of FIGS. 7B, 7C, and 7D.
Figure 8B:
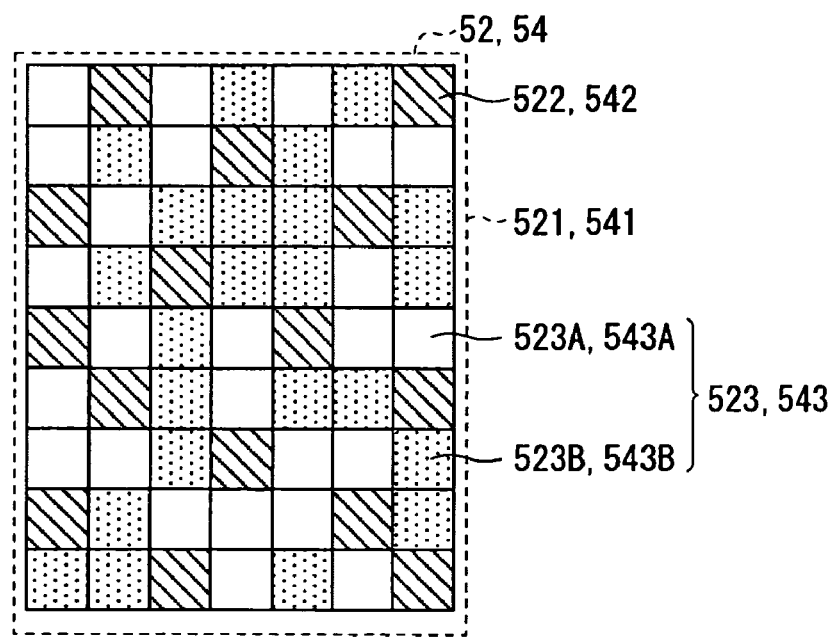

FIGS. 8A and 8B show configurations and functions of respective dots in the symbols of FIGS. 7B, 7C, and 7D. Of these figures, FIG. 8A shows a configuration and functions of respective dots in the anchor symbol 53, and FIG. 8B shows a configuration and functions of respective dots in the header symbol 52 and the data symbol 54.

The respective 4 dot regions in the four corners in the code section 531 of the anchor symbol 53 are areas for recognition 533A to 533D, respectively as described above. Therefore, of the code section 531 includes the total of 49 dots, 33 dots (49−4×4=33) can be utilized as a given black and white pattern.

Further, of the 33 dots after excluding the areas for recognition 533A to 533D, 9 dots are utilized for error correction of the data in the symbol as a bit for CRC 534. Therefore, the portion capable of being finally utilized as given data bit 535 is 24 dots (33−9=24). The data bit 535 of 24 dots is composed of normal rotation data bit 535A of 12 dots, half thereof, and inversion data bit 535B of 12 dots, the other half thereof.

Meanwhile, regarding the code section 521 of the header symbol 52 and the code section 541 of the data symbol 54, of the total of 63 dots, 15 dots are utilized for error correction of the data in the symbol as bit for CRC 522 and bit for CRC 542. Therefore, the portion capable of being utilized as given data bit 523 and 543 is 48 dots (63−15=48). The data bit of 48 dots is composed of normal rotation data bit 523A and 543A of 24 dots, half thereof, and inversion data bit 523B and 543B of 24 dots, the other half thereof.

FIGS. 9A, 9B, 9C, and 9D show examples of data configurations in the symbols of FIGS. 7A, 7B, 7C, and 7D. FIGS. 9A, 9B, 9C, and 9D respectively show a distribution of a data configuration of the region after excluding the area for recognition in the code sections 511, 521, 531, and 541 of the synchronous symbol 51 of FIG. 7A, the header symbol 52 of FIG. 7B, the anchor symbol 53 of FIG. 7C, and the data symbol 54 of FIG. 7D. The regions after excluding the area for recognition of FIGS. 9A to 9D are 33 bits, 63 bits, 33 bits, and 63 bits, respectively as described above.

Further, as described later, in the two-dimensional dynamic code, regarding FIGS. 9A to 9D, the units thereof are 2 symbols, 4 to 8 symbols, 1 symbol, and 1 to 16 symbols, respectively. In order to prevent lack of symbol (after-mentioned symbol error) in transmission and receiving, the synchronous symbol 51 and the header symbol 52 are typically configured so that every 2 same symbols are allocated.

Since the anchor symbol 53 is used mainly for detecting the angle, the size, and the light receiving position of the data symbol 54, if symbol lack occurs for the anchor symbol 53, there is no problem fundamentally. As described later, it is possible to determine communication quality by presence or frequency of lack of the anchor symbol 53. Further, lack of the data symbol 54 is to be corrected by using after-mentioned data for correcting symbol error. If correction is not made thereby, the display apparatus 1 is to retransmit a corresponding symbol.

Figure 9A:
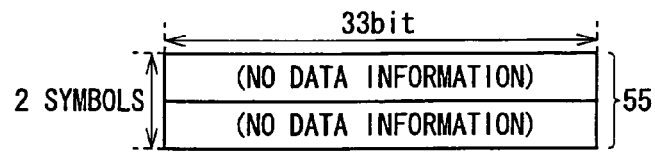
FIGS. 9A, 9B, 9C, and 9D are models showing examples of data configurations of the symbols of FIGS. 7A, 7B, 7C, and 7D.

As shown in FIG. 9A, in the data configuration 55 of 33 bits after excluding the area for recognition in the synchronous symbol 51, there is no data information since the symbol is used for recognizing that the symbol is the foremost symbol in the two-dimensional dynamic code and detecting angles, sizes, and light receiving positions of subsequent respective symbols.

Figure 9B:
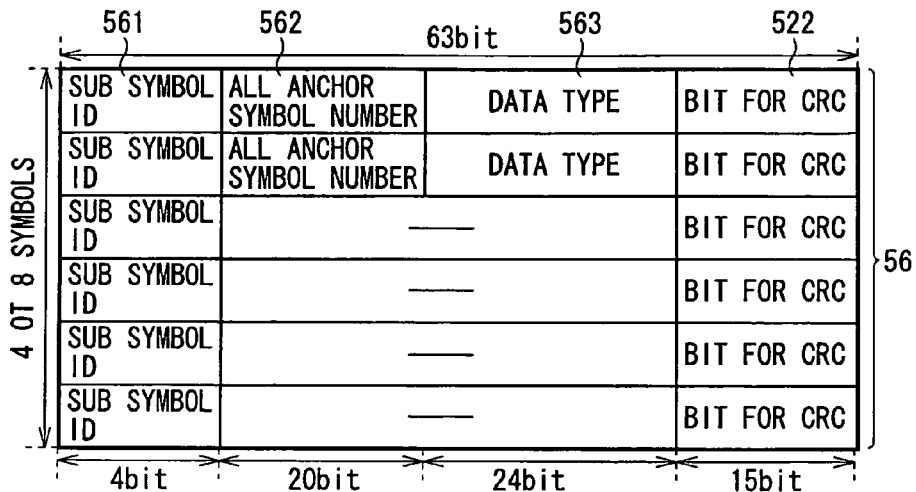

Further, as shown in FIG. 9B, there is no area for recognition in the header symbol 52, and therefore data of 63 bits can be wholly utilized. A data configuration 56 thereof is as follows. That is, commonly to 4 to 8 symbols, of 63 bits, 4 bits are constructed as a sub symbol ID 561, 15 bits are constructed as the bit for CRC 522 as described above, and remaining 44 bits are constructed as a given data region.

Further, in the first 2 symbols, the given data region is further composed of an all anchor symbol number 562 of 20 bits and a data type 563 of 24 bits. Meanwhile, in the subsequent symbols, the given data region is not defined. Such data region is a region to be specified with the future format, and it is prohibited to voluntarily use such data region.

The sub symbol ID 561 is an identifier for showing an order of symbols in the header symbol 52 (1 to 8 at maximum for 4 bits). Thereby, each symbol in the header symbol can be identified. Further, the bit for CRC 522 is utilized for error correction in the symbol by CRC. The all anchor symbol number 562 shows the total number of the anchor symbol 53 included in the two-dimensional dynamic code. Since 20 bits are allocated, it is possible to define up to 1 M symbols. The data type 563 shows a type of the data included in the data symbol 54.

Figure 9C:
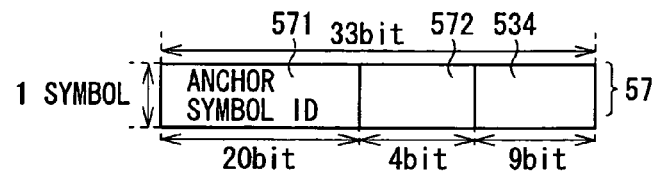

As shown in FIG. 9C, regarding a data configuration 57 of 33 bits after excluding the area for recognition in the anchor symbol 53, 20 bits are constructed as an anchor symbol ID 571, 4 bits are constructed as a sub symbol number of data symbol 572, and remaining 9 bits are constructed as the bit for CRC 534 as described above.

The anchor symbol ID 571 is an identifier for showing the order in the all anchor symbols defined by the foregoing all anchor symbol number 562. By the anchor symbol ID 571 and a sub symbol ID 581 of 4 bits included in the data symbol 54, each data symbol in the two-dimensional dynamic code becomes identifiable. Further, regarding the identifier for each data symbol, two-stage configuration of the anchor symbol ID 571 and the sub symbol ID 581 is adopted. Thereby, it is not necessary that the identifiers are numbered serially according to the all data symbols. Therefore, it is possible to control the bit number of the sub symbol ID 581 to only 4 bits, and more bit number of given data information is secured. In the result, the total amount of transmittable data information is increased, and therefore data information can be effectively transmitted. The bit for CRC 534 is utilized for error correction in the symbol by CRC as described above.

The sub symbol number of data symbol 572 is the sub symbol number included in one set of data symbols (1 to 16 symbols as described above). By the sub symbol number of data symbol 572, the sub symbol number included in the data symbols can be defined. This one set of data symbols will be hereinafter referred to as 1 sector.

Figure 9D:
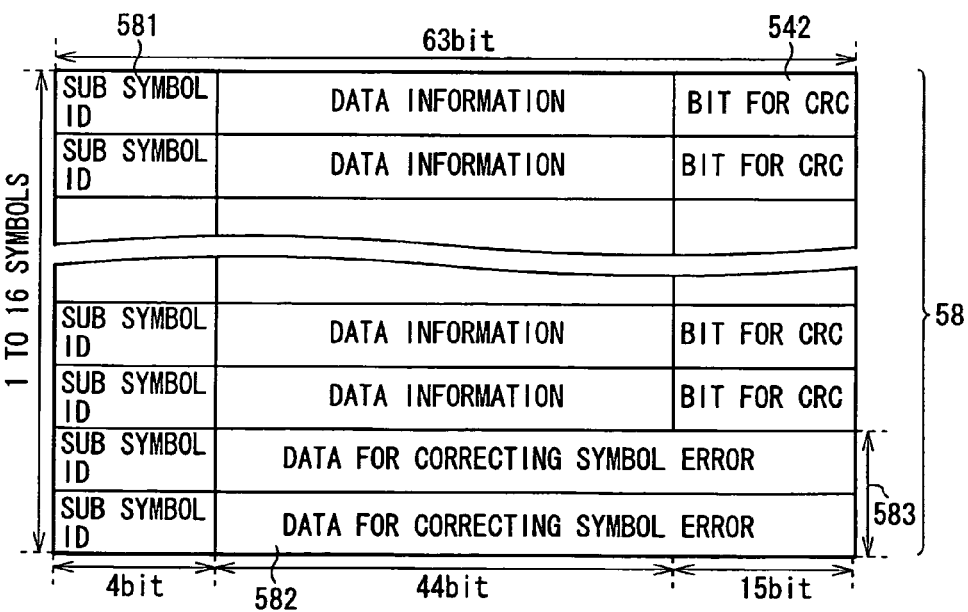

As shown in FIG. 9D, in the data symbol 54, as in the header symbol 52 of FIG. 9B, there is no area for recognition. Therefore, data of 63 bits can be wholly utilized. A data configuration 58 thereof is as follows. That is, commonly to 1 to 16 symbols, of 63 bits, 4 bits are constructed as the sub symbol ID 581, 44 bits are constructed as given data information, and remaining 15 bits are constructed as the bit for CRC 542 as described above.

As 2 symbols indicated by arrow 583 in the figure, the region of 59 bits after excluding the sub symbol ID of 4 bits may be used as data for correcting symbol error 582. The data for correcting symbol error 582 is data playing a roll for correcting a symbol error when the data symbol itself is lacked during data transmission and receiving using the two-dimensional dynamic code. Therefore, when there is no lack of a data symbol itself during data transmission and receiving, as described above, the data configuration 58 of the data symbol 54 includes the sub symbol ID 581, given data information, and the bit for CRC 542 for all symbols.

Figure 10:
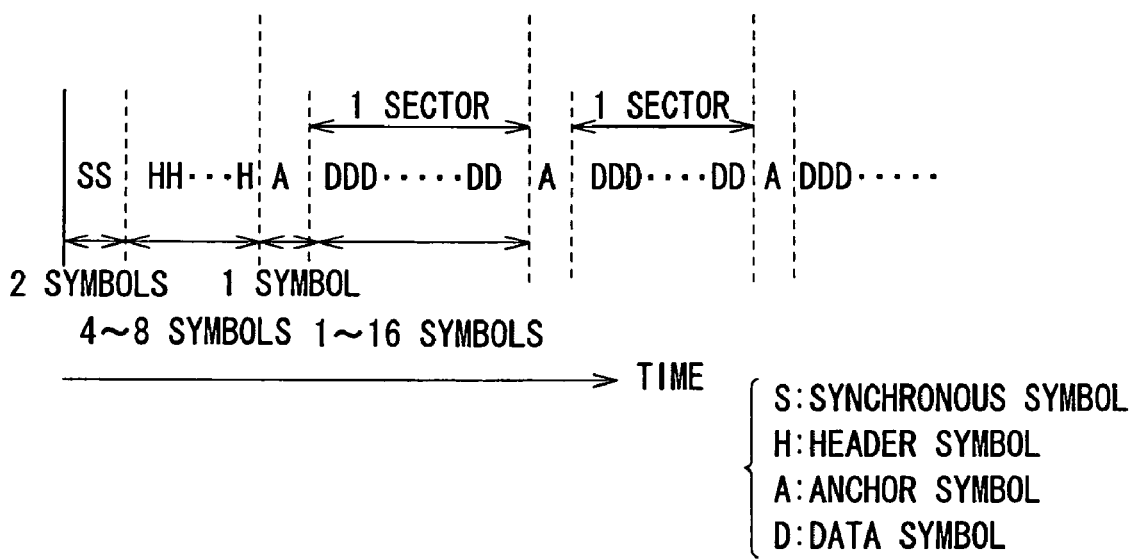
FIG. 10 is a model showing an order configuration of each symbol of the two-dimensional dynamic code of FIGS. 7A, 7B, 7C, and 7D.

FIG. 10 shows an order configuration of symbols of the two-dimensional dynamic code of FIGS. 7A, 7B, 7C, and 7D. The figure shows a model of the order configuration of the symbols along the time axis. The synchronous symbol 51 is indicated as S, the header symbol 52 is indicated as H, the anchor symbol 53 is indicated as A, and the data symbol 54 is indicated as D. The order of the symbols of the two-dimensional dynamic code in the format is constructed from the start of the two-dimensional dynamic code along the time axis described above as follows: 2 synchronous symbols, 4 to 8 header symbols, (1 anchor symbol, 1 sector of data symbols), (1 anchor symbol, 1 sector of data symbols) and so forth. That is, configuration is made so that combination of 1 anchor symbol and 1 sector of data symbols is repeated.

Since the order of the symbols is constructed as above, it becomes possible to separately set the sub symbol number of the data symbol 54 in units of each sector by the sub symbol number of data symbol 572 included in each anchor symbol 53.

The maximum symbol number usable in the two-dimensional dynamic code constructed as above is (2 raised to the 20th power)×(biquadrate of 2)=16 M symbols, which is calculated from the all anchor symbol number 562 of 20 bits included in the header symbol 52 and the sub symbol number of data symbol 572 included in the anchor symbol 53 in each sector as described above. Further, the usable maximum data capacity is 16 M symbols×44 bits=about 738 M bits=about 92 M bytes if there is no data for correcting symbol error 582 descried above, since given data information of 44 bits are secured for each data symbol 54 as described above. Therefore, compared to traditional barcodes and two-dimensional codes (about several K bytes at the maximum), significantly high capacity data becomes usable.

Further, for example, where 1 symbol pattern is allocated to 1 frame, and the symbol pattern number per 1 sec is 60 (symbols/sec) with reference to NTSC (National TV Standards Committee) method, the maximum data transfer rate is 60 (symbols/sec)×44 (bits/symbol)×(16/17)=about 2485 bps (bit/sec). (16/17) in the calculation formula means that of 17 symbols, 16 data symbols 54 are included at the maximum per 1 sector (remaining 1 symbol is the anchor symbol 53).

Shapes and data configurations of the symbols of the two-dimensional dynamic code in this embodiment are not limited to the foregoing aspects, but other aspects may be adopted.

Next, an outline of processes for transmitting and receiving contents data between the display apparatus 1 and the input and output terminal 2 in the communication system configured as above will be described.

Figure 11:
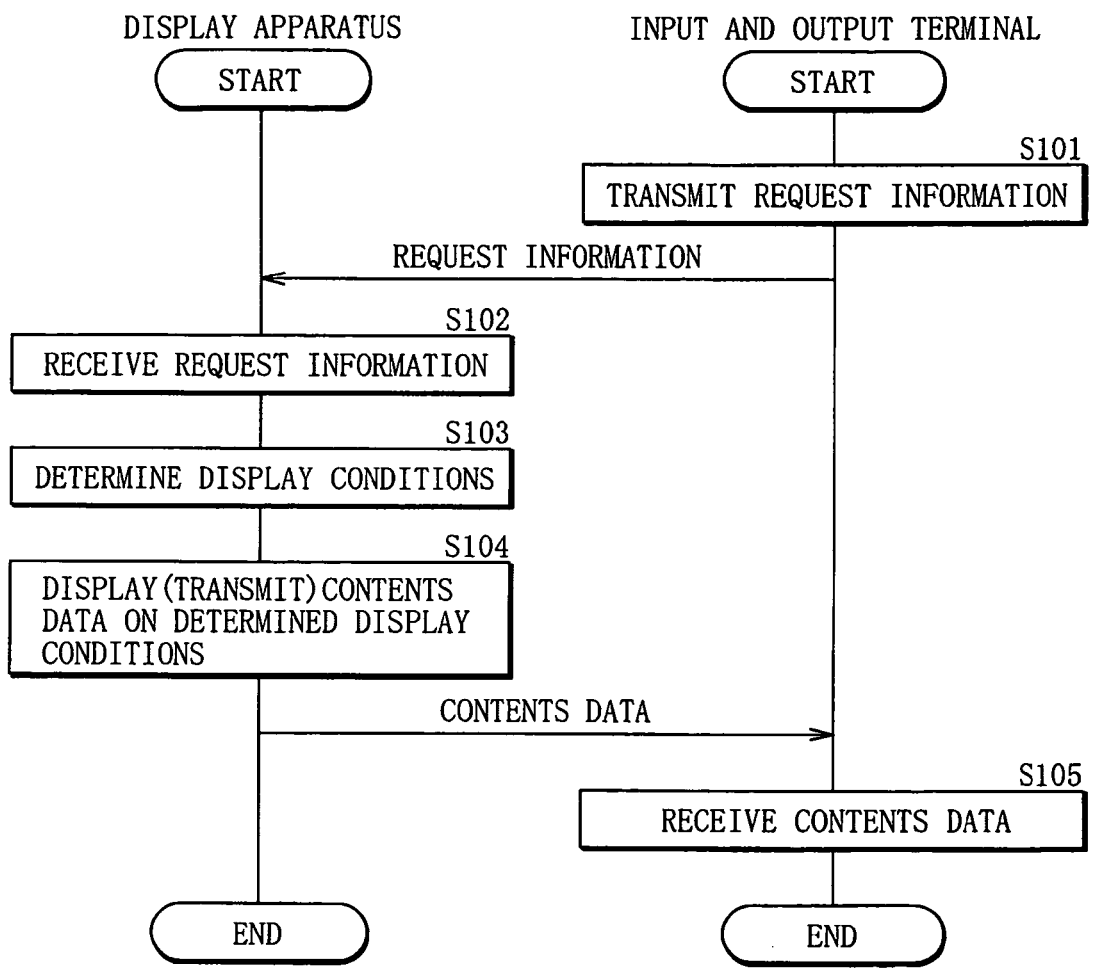
FIG. 11 is a flowchart showing an example of transmission and receiving processes of information between the display apparatus and the input and output terminal in the communication system of FIG. 1.

FIG. 11 shows an outline of processes for transmitting and receiving information between the display apparatus 1 and the input and output terminal 2 in the communication system of FIG. 1. In this example, the case where the input and output terminal 2 first requests the display apparatus 1 to transmit contents data (transmits request information for requesting transmission), and the display apparatus 1 receiving the request information transmits the contents data to the input and output terminal 2.

First, as shown in FIG. 4, a user approximates the light-receiving-emitting section 21 of the input and output terminal 2 to the light-receiving-emitting section 11 of the display apparatus 1. Thereby, request information for requesting transmission of contents data (for example, the image 121A in FIG. 4) is transmitted to the display apparatus 1 by using the two-dimensional dynamic code (Step S101).

The display apparatus 1 receiving the two-dimensional dynamic code (Step S102) performs image processing and decode processing for each symbol of the two-dimensional dynamic code and acquires the transmission request information. Concurrently, as described above, the display apparatus 1 calculates and acquires the symbol-transmission-receiving-status information SI from the synchronous symbol 51 and the anchor symbol 53. After that, the display apparatus 1 determines the display conditions DC in transmitting the contents data to the input and output terminal 2 by using the two-dimensional dynamic code (Step S103).

Next, the display apparatus 1 displays each symbol of the two-dimensional dynamic code on the light-receiving-emitting section 11 considering the determined display conditions DC, and thereby transmits the contents data to the input and output terminal 2 (Step S104). The input and output terminal 2 receives the contents data (Step S105), and the processes for transmitting and receiving the contents data between the display apparatus 1 and the input and output terminal 2 are finished.

As above, the display apparatus 1 determines the display conditions DC based on the symbol of the two-dimensional dynamic code transmitted from the input and output terminal 2, and transmits the contents data using the two-dimensional dynamic code to the input and output terminal 2 considering the display conditions DC. Therefore, the contents data can be surely transmitted and received.

Next, the processes for transmitting and receiving the contents data between the display apparatus 1 and the input and output terminal 2 as above will be described in detail.

Figure 12:
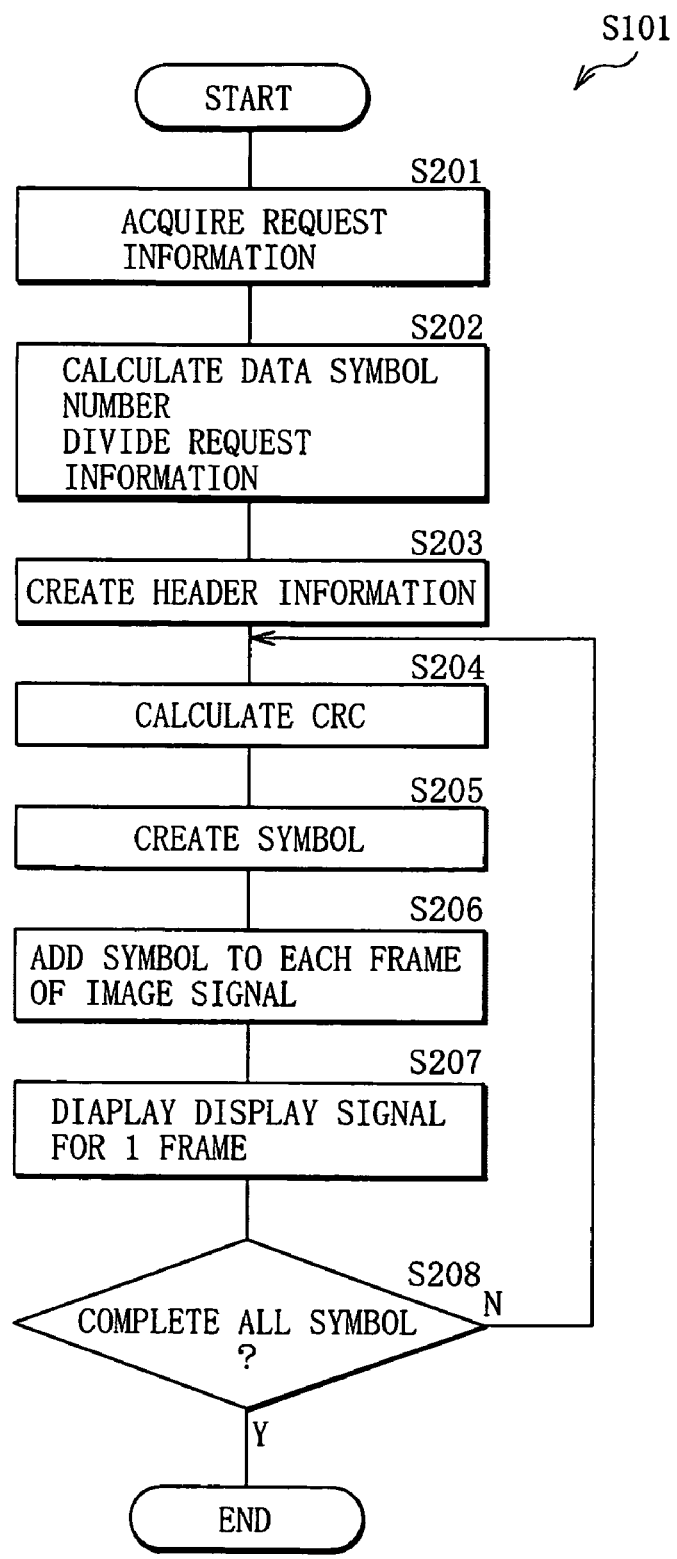
FIG. 12 is a flowchart showing an example of processes that the input and output terminal transmits information to the display apparatus by using the two-dimensional dynamic code in FIG. 11.

FIG. 12 shows an example of processes that the input and output terminal 2 transmits information to the display apparatus 1 by using the two-dimensional dynamic code, which correspond to Step S101 of FIG. 11.

First, for example, in this case, based on information (request information) input from an unshown operation section or the like, the image signal generation section 241 generates an image signal for one screen, and outputs the image signal to the symbol creation section 242. That is, the symbol creation section 242 acquires request information for creating each symbol in the two-dimensional dynamic code (Step S201).

Next, the symbol creation section 242 calculates the data symbol number included in the two-dimensional dynamic code, and divides the acquired request information according to the calculated data symbol number (Step S202). The data symbol number is calculated, for example, according to a data capacity of the request information and a format of the two-dimensional dynamic code. Specifically, a data capacity of each data symbol is 44 bits, and the data symbol number is calculated based on such data capacity.

The symbol creation section 242 creates header information included in the two-dimensional dynamic code based on the request information (Step S203). Further, the symbol creation section 242 calculates data for CRC and the like (Step S204). Then, the symbol creation section 242 adds these header information and data for CRC to the request information, and creates symbols for every screen (Step S205). The patterns of the symbols created as above are not limited to different patterns for every frame, but it is possible that 1 symbol pattern exists for several frames.

Next, the display signal generation section 243 synthesizes the screen signal for every screen output from the image signal generation section 241 and the symbol for every screen output from the symbol creation section 242, and generates a display signal for every screen displayed on the light-receiving-emitting section 21 (Step S206).

Based on the display signal output from the display signal generation section 243, the light-receiving-emitting control section 210 and the light-receiving-emitting section 21 display images of figures, texts and the like for 1 frame and each symbol of the two-dimensional dynamic code created in the symbol creation section 242, and transmits the request information (Step S207). As above, the symbols of the two-dimensional dynamic code are sequentially displayed. Until all symbols included in the two-dimensional dynamic code are completely displayed, the processes of Steps S204 to S207 are repeated. When display is completed, the processes that the input and output terminal 2 transmits request information to the display apparatus 1 by using the two-dimensional dynamic code are finished (Step S208).

Figure 13:
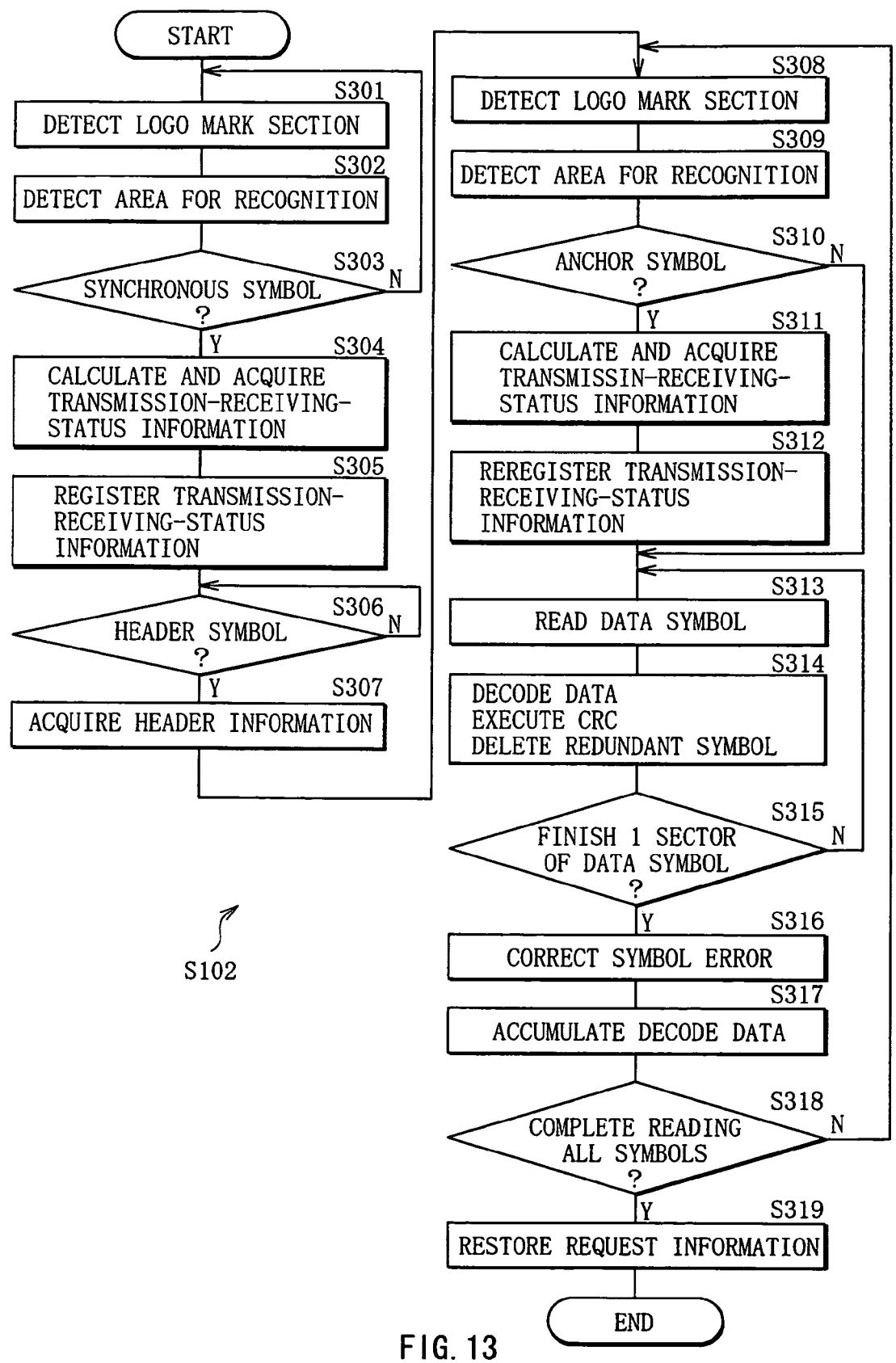
FIG. 13 is a flowchart showing an example of processes that the display apparatus receives information from the input and output terminal by using the two-dimensional dynamic code in FIG. 11.

FIG. 13 shows an example of processes that the display apparatus 1 receives information from the input and output terminal 2 by using the two-dimensional dynamic code, which corresponds to Step S102 of FIG. 11.

First, the memory section 151 reconstructs a light receiving signal received by the light-receiving-emitting section 11 to a light receiving signal for every screen, stores and retains the reconstructed light receiving signal in the frame memory. That is, in the beginning, the light receiving signal is read as above. Then, the image processing section 152 processes the image to extract each symbol of the two-dimensional dynamic code, and thereby whether the read symbol is the synchronous symbol 51 or not is determined. Extraction of the synchronous symbol 51 is performed by firstly detecting the rectangular logo mark section 512 in the shape of the synchronous symbol shown in FIG. 7A from the rectangular shape, the horizontal to vertical length ratio and the like (Step S301), secondly detecting the area for recognition included in the code section 511 from the shape (Step S302), and finally detecting the previously set shape of the whole code section 511. Then, based on these shapes, whether the read symbol is the synchronous symbol 51 or not is determined (Step S303). When the read symbol is not the synchronous symbol 51, the flow returns back to Step S301, and such processes are repeated until the synchronous symbol is read.

When the read symbol is the synchronous symbol 51, the symbol-transmission-receiving-status information acquisition section 155 calculates and acquires the foregoing symbol-transmission-receiving-status information SI based on the data of the synchronous symbol extracted in the image processing section 152.

Detailed descriptions will be hereinafter given of processes for calculating and acquiring the symbol-transmission-receiving-status information SI in the symbol-transmission-receiving-status information acquisition section 155.

Figure 14A:
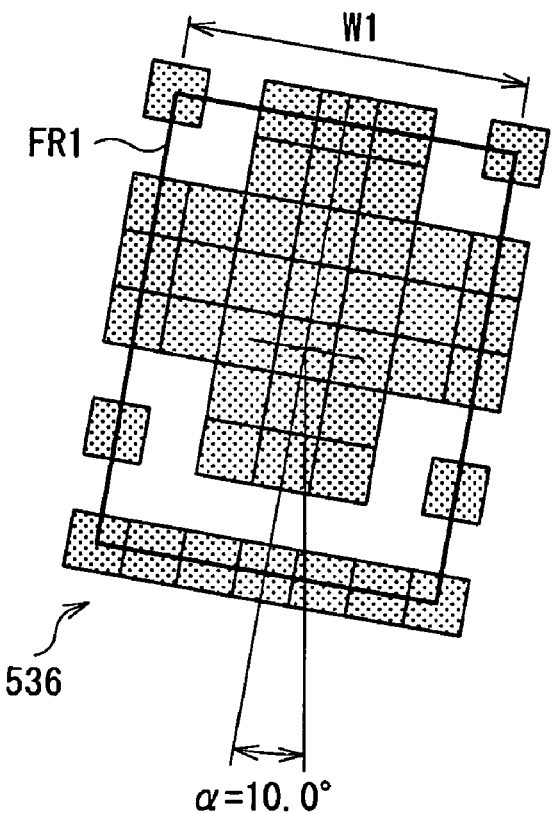
FIGS. 14A and 14B are models showing an example of processes that the display apparatus calculates and acquires symbol-transmission-receiving-status information in FIG. 11.
Figure 14B:
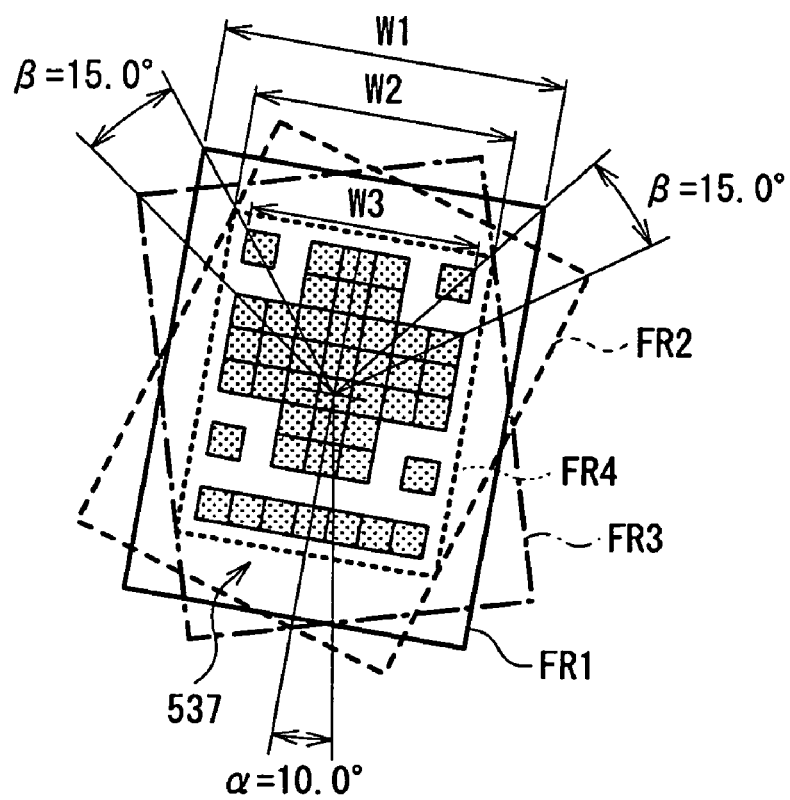

FIGS. 14A and 14B show an example of processes that the display apparatus 1 calculates and acquires the symbol-transmission-receiving-status information SI in FIG. 11. In these figures, FIG. 14A shows a shape of the synchronous symbol that the light-receiving-emitting section 11 of the display apparatus 1 receives from the light receiving section 21 of the input and output terminal 2. FIG. 14B shows processes for calculating the symbol-transmission-receiving-status information SI based on the received synchronous symbol.

As shown in FIG. 14A, it is presumed that the light-receiving-emitting section 11 of the display apparatus 1 receives the synchronous symbol 536 from the light-receiving-emitting section 21 of the input and output terminal 2 in a tilted shape at an angle of α=10° to the right side. That is, in this example, the case where the angle α of the light-receiving-emitting section 21 of the input and output terminal 2 to the light-receiving-emitting section 11 of the display apparatus 1 (relative angle between the light-receiving-emitting section 21 and the light-receiving-emitting section 11) is detected 10° is shown. FR1 in the figure represents a rectangle made by connecting each dot at the most end among the area for recognition in the four corners of the synchronous symbol 536, and W1 represents a short side length of the rectangle FR1.

The angle α, the rectangle FR1, and the short side length W1 are detected by the symbol-transmission-receiving-status information acquisition section 155 based on position coordinates of each dot in the synchronous symbol 536 extracted by the image processing section 152. In order to ensure subsequent transmission of the contents data to the input and output terminal 2, it is necessary that the symbol-transmission-receiving-status information acquisition section 155 calculates symbol-transmission-receiving-status information based on the angle a and the short side length W1, and appropriate display conditions DC are determined in the display conditions determination section 156.

First, it is necessary that the display apparatus displays 1 displays a symbol within the frame of the rectangle FR1. The reason thereof is that it is not possible to know to what region out of the frame of the rectangle FR1 the light-receiving-emitting section 21 of the input and output terminal 2 on the receiving side can recognize. Further, until the time when the symbol-transmission-receiving-status information S1 is subsequently calculated and acquired (in this case, as described later, until the time when the symbol-transmission-receiving-status information S1 is acquired based on the anchor symbol in Step S311), flexibility of angle deviance by angle β on either side from the angle α is further considered. Here, a rectangle FR2 and a rectangle FR3 respectively represent a rectangle, which is deviated by angle β on either side from the rectangle FR1. In this example, as shown in the figure, descriptions will be given of a case where flexibility of angle deviance β is 15° as shown in the figure. However, the flexibility of angle deviance β can be voluntarily set by a user according to purpose of usage and application.

Next, considering the flexibility of angle deviance β, the symbol-transmission-receiving-status information acquisition section 155 calculates a rectangle FR4 whose short side length is within any frame of the rectangles FR1 to FR3. A short side length W2 of such a rectangle FR4 can be calculated by the following formula (1).

$$W2 = W1 \times (1 - \sin \beta)/\cos \beta \tag{1}$$

For the rectangle FR4 having the short side length W2 calculated as above, flexibility of position deviance from the light receiving position of the symbol is further considered. That is, the symbol is displayed at the size (short side length W3 of FIG. 14B) obtained by respectively multiplying the short side length and the long side length of the rectangle FR4 by 0.9 times (Symbol 537 of FIG. 14B). By considering flexibility of angle deviance and position deviance as above, contents data can be further surely transmitted. In this example, descriptions are given of the case where flexibility of position deviance is 0.9 times. However, flexibility of position deviance can be set voluntarily by a user according to usage purpose and application as flexibility of angle deviance β.

As above, the symbol-transmission-receiving-status information acquisition section 155 calculates and acquires the symbol-transmission-receiving-status information SI including information showing a relative angle between the light-receiving-emitting section 21 and the light-receiving-emitting section 11 such as angles α and β, information showing a size of the symbol of the two-dimensional dynamic code shown on the light-receiving-emitting section 21 such as short side lengths of rectangles W2 and W3, information showing a light receiving position in the light-receiving-emitting section 11 of the symbol of the two-dimensional dynamic code and the like. Then, the symbol-transmission-receiving-status information acquisition section 155 outputs the symbol-transmission-receiving-status information SI to the display conditions determination section 156.

The display conditions determination section 156 registers the symbol-transmission-receiving-status information SI (Step S305), which are subsequently considered when the display conditions DC are determined in Step S103 and contents data are transmitted in Step S104.

The processes for calculating and acquiring the symbol-transmission-receiving-status information SI are not limited to the example explained above, but other method can be used for calculation as long as the method determines appropriate display conditions DC.

Descriptions will be back to explanation of FIG. 13. Next, the memory section 151 and the image processing section 152 read the next symbol as in Step S301, and output the extracted symbol to the decode section 153. The decode section 153 performs decode process and executes CRC, and determines whether the read symbol is the header symbol 52 or not (Step S306). When the read symbol is not the header symbol 52, such process is repeated until the header symbol 52 is read.

When the read symbol is the header symbol 52, header information included in the header symbol 52 (all anchor symbol number 562, data type 563 and the like) is acquired (Step S307). The information acquisition section 154 acquires such header information, and thereby such information becomes comprehensible.

Next, the memory section 151 and the image processing section 152 read the next symbol as in Steps S301 to S302. The logo mark section in the shape of the anchor symbol shown in FIG. 7C is detected (Step S308), and the area for recognition in the shape of the anchor symbol shown in FIG. 7C is detected (Step S309), and thereby (that is, from the reference elements), whether this symbol is the anchor symbol 53 or not is determined (Step S310).

When the read symbol is the anchor symbol 53, as in Steps S304 to S305, the symbol-transmission-receiving-status information acquisition section 155 calculates and acquires the symbol-transmission-receiving-status information SI based on the data of the extracted anchor symbol (Step S311), and the display conditions determination section 156 updates, that is, reregisters the symbol-transmission-receiving-status information SI (Step S305). As above, since the display apparatus 1 updates the symbol-transmission-receiving-status information SI in units of sector, and finally determines the display conditions DC, contents data can be more surely transmitted to the input and output terminal 2.

Meanwhile, when the symbol read in Steps S308 to S309 is not the anchor symbol 53 (possibly in the case of lack of symbol in reading since only one anchor symbol 53 exists in 1 sector), or when the decode section 153 is not able to recognize that the symbol is the anchor symbol, acquisition and re-registration of the symbol-transmission-receiving-status information SI are not performed, and the flow is directly forwarded to the next process (reading the data symbol 54 in Step S313). The anchor symbol 53 is mainly used for detecting angles, sizes and light receiving positions of data symbols. Since such detection is performed in units of sector, there is no problem even if the detection is not able to be performed once. Furthermore, on the contrary, it is possible to determine communication quality of the communication using the two-dimensional dynamic code by presence and frequency of lack of the anchor symbol 53.

Next, the data symbol 54 is read (Step S313), and the decode section 153 performs decode process and executes CRC. Then, the symbol number is checked. When the same symbol is redundantly read, the redundant data is deleted (Step S314). Whether the symbol is redundant or not is determined by, for example, the anchor symbol ID 571 and the sub symbol ID 581.

Next, whether the data symbols 54 of 1 sector are completely read or not is determined (Step S315). If not, the flow is returned back to Step S313, and the next data symbol is read. When reading the data symbols 54 of 1 sector is completed, if symbol error (lack of the data symbol 54 itself in reading) occurs, the symbol error is corrected (Step S316). Regarding a method of correcting symbol error of the data symbol 54, first, correction is made by using the data for correcting symbol error 582. When correction is not thereby made, the input and output terminal 2 is to retransmit a corresponding data symbol.

Whether the data symbols 54 of 1 sector are completely read or not is determined by the sub symbol ID 581 and the sub symbol number of the data symbol 572 included in each anchor symbol for every sector.

Next, the information acquisition section 154 accumulates decoded data (Step S317), and determines whether all symbols are completely read or not (Step S318). If not, the flow is returned back to step S305, and a light receiving signal of the anchor symbol 53 of the next sector is acquired. If reading is completed, the information acquisition section 154 restores and acquires information (in this case, request information) (Step S319). Thereby, the processes for receiving information by using the two-dimensional dynamic code are finished.

Next, detailed descriptions will be given of processes that the display apparatus 1 which receives request information from the input and output terminal 2 and acquires the symbol-transmission-receiving-status information SI in Step S102 determines the display conditions DC and transmits contents data to the input and output terminal 2 on the determined display conditions DC (corresponding to Steps S103 to S104 of FIG. 11).

The display conditions determination section 156 restores completely received request information and comprehends the contents of the request information in Step S319. Then, the display conditions determination section 156 determines the display conditions DC (a display angle, a size, a display position and the like when the symbol is subsequently displayed for the light-receiving-emitting section 21 of the input and output terminal 2), and outputs the display conditions DC to the display signal generation section 143. After that, the display signal generation section 143 generates display signals by considering the display conditions DC, and therefore the symbol of the two-dimensional dynamic code is displayed in the aspect based on the display conditions DC.

For the details of processes that the display apparatus 1 transmits contents data to the input and output terminal 2 by using created symbols of the two-dimensional dynamic code, and processes that the input and output terminal 2 receives the contents data, descriptions will be omitted since the processes are similar to of Steps S101 and S102. (However, in this case, differently from the display apparatus 1, the input and output terminal 2 does not have the symbol-transmission-receiving-status information acquisition section 155 and the display conditions determination section 156 as shown in FIG. 6, and therefore the processes for acquiring the symbol-transmission-receiving-status information SI and determining the display conditions DC are not performed.)

As described above, according to the display apparatus, the communication system, and the communication method of this embodiment, the display apparatus 1 and the input and output terminal 2 respectively include the light-receiving-emitting sections 11 and 21 capable of displaying moving picture and receiving light. In the input and output terminal 2, each symbol composing the two-dimensional dynamic code is sequentially displayed on the light-receiving-emitting section 21 along the time axis. In the display apparatus 1, each symbol is read by the light-receiving-emitting section 11, the symbol-transmission-receiving-status information SI including information showing the relative angle between the light-receiving-emitting section 21 and the light-receiving-emitting section 11, information showing the size of the symbol displayed on the light-receiving-emitting section 21, the light receiving position of the read symbol and the like is obtained based on the read symbol, the display conditions DC such as the display angle, the size, the display position in displaying the two-dimensional dynamic code for the light-receiving-emitting section 21 by the light-receiving-emitting section 11 are determined based on the symbol-transmission-receiving-status information SI, and then each symbol of the two-dimensional dynamic code is displayed based on the display conditions DC. Therefore, by displaying in the aspect in which the light-receiving-emitting section 21 of the input and output terminal 2, the receiver can surely read, contents data can be surely and effectively transmitted and received between the display apparatus 1 and the input and output terminal 2.

Further, each symbol of the two-dimensional dynamic code is composed of several types of formats composed of the synchronous symbol 51, the header symbol 52, the data symbol 54, and the anchor symbol 53. Of the foregoing, the header symbol and the anchor symbol, which include a plurality of reference elements in the symbol are used to acquire the symbol-transmission-receiving-status information SI. Therefore, the symbol-transmission-receiving-status information SI can be effectively acquired from the reference element previously set in a given shape. Further, since the anchor symbol 51 is displayed in units of sector, the symbol-transmission-receiving-status information SI can be regularly updated.

Further, the display conditions DC are determined and the two-dimensional dynamic code based on the conditions are displayed on the side of the display apparatus 1 including the light-receiving-emitting section 11 having wider range capable of displaying the moving pictures and receiving light than the light-receiving-emitting section 21 of the input and output terminal 2. Further, when the display conditions DC are determined, flexibility of position deviance from the light receiving position of the read symbol and flexibility of angle deviance from the angle of the light-receiving-emitting section 11 to the light-receiving-emitting section 21 are considered. Therefore, these flexibilities are included in deviances of the position and the angle of the light-receiving-emitting section 21 caused by oppositely arranging the input and output terminal 2 by user's hand to the display apparatus 1, and contents data can be transmitted and received more surely.

Descriptions will be hereinafter given of Modification 1 of the embodiment.

[Modification 1]

In the embodiment, as shown in FIGS. 14A and 14B, the example in which the display apparatus 1 receiving the symbol 536 in the tilted shape from the input and output terminal 2 adjusts the position and the size of the symbol while maintaining the tilted angle, and thereby calculates the symbol-transmission-receiving-status information SI and determines the display conditions DC has been described. In this modification, the case where the display apparatus 1 adjusts the position and the size of the symbol, and in addition, adjusts to return the tilted angle, and thereby calculates the symbol-transmission-receiving-status information SI and determines the display conditions DC.

Figure 15A:
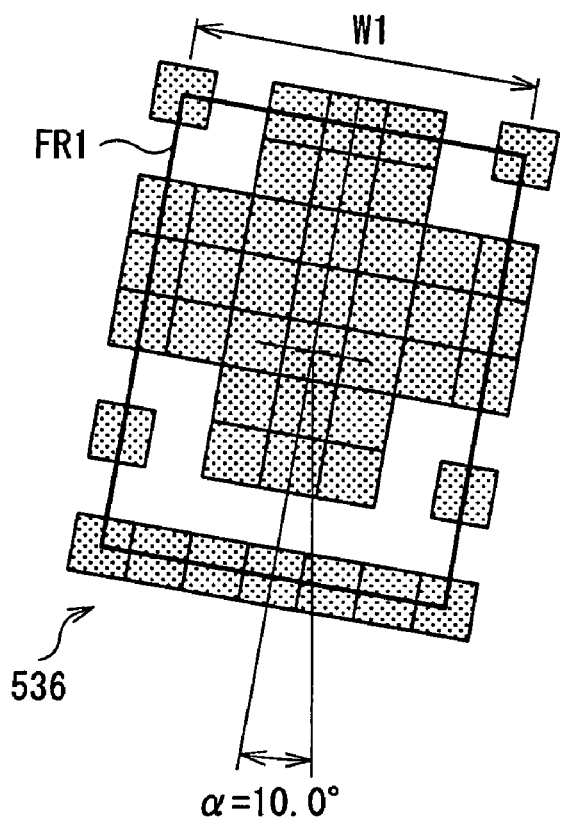
FIGS. 15A and 15B are models showing an example of processes that the display apparatus calculates and acquires symbol-transmission-receiving-status information in Modification 1.
Figure 15B:
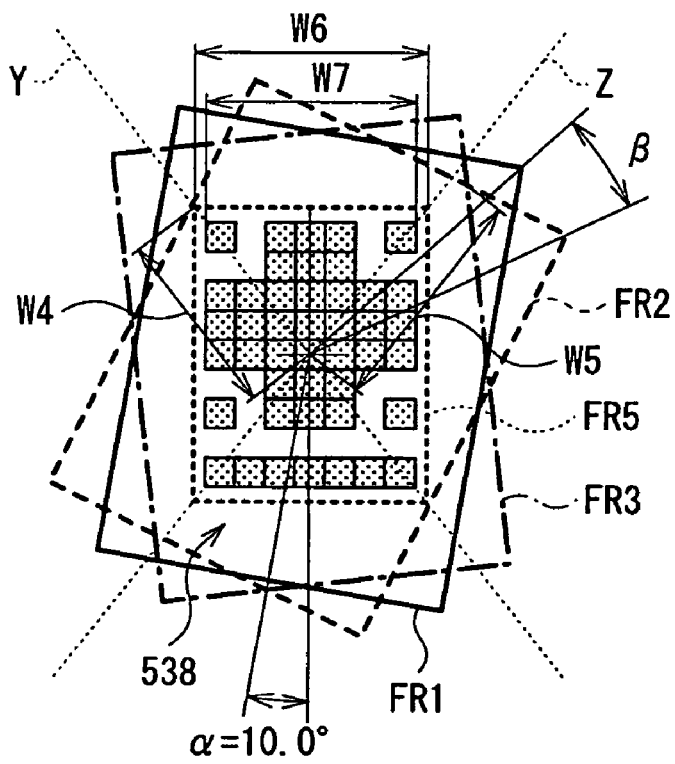

FIGS. 15A and 15B show an example of processes that the display apparatus 1 calculates and acquires the symbol-transmission-receiving-status information SI in this modification, which corresponds to FIGS. 14A and 14B in the embodiment. As FIGS. 14A and 14B, FIG. 15A shows a shape of the synchronous symbol that the light-receiving-emitting section 11 of the display apparatus 1 receives from the light-receiving-emitting section 21 of the input and output terminal 2. FIG. 15B shows processes for calculating the symbol-transmission-receiving-status information SI based on the received synchronous symbol. As the case shown in FIG. 14A, the case where the light-receiving-emitting section 11 of the display apparatus 1 receives the synchronous symbol 536 in a tilted shape at an angle of $\alpha=10°$ to the right side from the light-receiving-emitting section 21 of the input and output terminal 2 will be described. Further, since processes in the case of the anchor symbol are similar to the processes in the case of the synchronous symbol, the descriptions thereof will be omitted.

As shown in FIG. 15A, the light-receiving-emitting section 11 of the display apparatus 1 receives the synchronous symbol 536 in a tilted shape at an angle of $\alpha=10°$ to the right side from the light-receiving-emitting section 21 of the input and output terminal 2. In this case, as described above, first, the display apparatus 1 should display the symbol within the frame of the rectangle FR1. Further, as described above, flexibility of angle deviance by angle $\beta$ on either side from the angle $\alpha$ is considered.

Here, considering the flexibility of angle deviance $\beta$, the symbol-transmission-receiving-status information acquisition section 155 calculates a rectangle FR5 whose short side length is within any frame of the rectangles W1 to W3, and which corresponds to the case that the tilted angle $\alpha$ is returned to 0°. Such a rectangle FR5 is obtained as follows. That is, as shown in the figure, first, diagonal lines Y and Z are drawn from the common center of the rectangles FR1 to FR3 in the direction of the angle $\alpha=0°$. Distances W4 and W5 from the center to the intersection of the diagonal lines Y and Z and the frame of the rectangle FR2 are respectively obtained. (In this example, the rectangle FR2 whose distance from the center is shorter is selected from the rectangle FR2 and the rectangle FR3. However, according to the circumstances, a rectangle whose distance from the center is shorter may be selected.) Next, W4 whose distance is shorter is selected from the distances W4 and W5. The rectangle having the diagonal line W4 becomes FR5.

For the rectangle FR5 obtained as above (short side length W6), as described above, flexibility of position deviance from the light receiving position of the symbol is further considered. That is, the symbol is displayed with the size (short side length W7 of FIG. 15B) obtained by respectively multiplying the short side length and the long side length of the rectangle FR5 by 0.9 times (Symbol 538 of FIG. 15B). Thereby, the processes that the display apparatus 1 calculates and acquires the symbol-transmission-receiving-status information SI are finished.

As above, according to the display apparatus, the communication system, and the communication method of this modification, the display apparatus 1 adjusts the position and the size of the symbol, and in addition, adjusts to return the tilted angle, and thereby calculates the symbol-transmission-receiving-status information SI and determines the display conditions DC. Therefore, in addition to the effects of the foregoing embodiment, the size of the symbol can be maximized. Consequently, by maximizing the size of the symbol, an information amount to be transmitted and received can be increased according to the format of the symbol.

Next, descriptions will be given of Modification 2 of the embodiment.

[Modification 2]

In the embodiment, as shown in FIG. 7A to FIG. 10, descriptions have been given with the example, in which each symbol of the two-dimensional dynamic code is composed of a plurality of types of shapes of formats including the synchronous symbol 51, the header symbol 52, the anchor symbol 53, and the data symbol 54. In this modification, descriptions will be given of the example, in which each symbol of the two-dimensional dynamic code is composed of a single shaped format.

First, the shape of the two-dimensional dynamic code and configurations and functions of each dot according to this modification will be described.

Figure 16A:
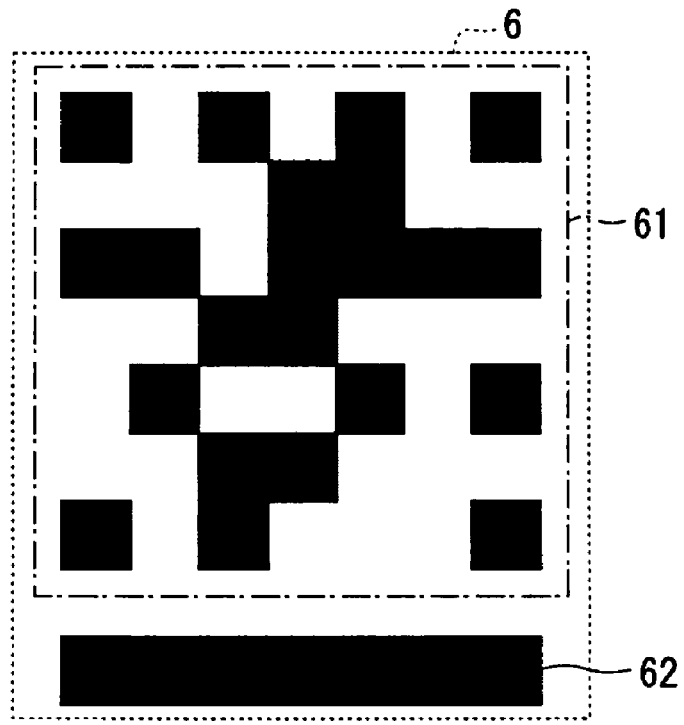
FIGS. 16A and 16B are models showing an example of a shape of a symbol of a two-dimensional dynamic code and configurations and functions of each dot according to Modification 2.
Figure 16B:
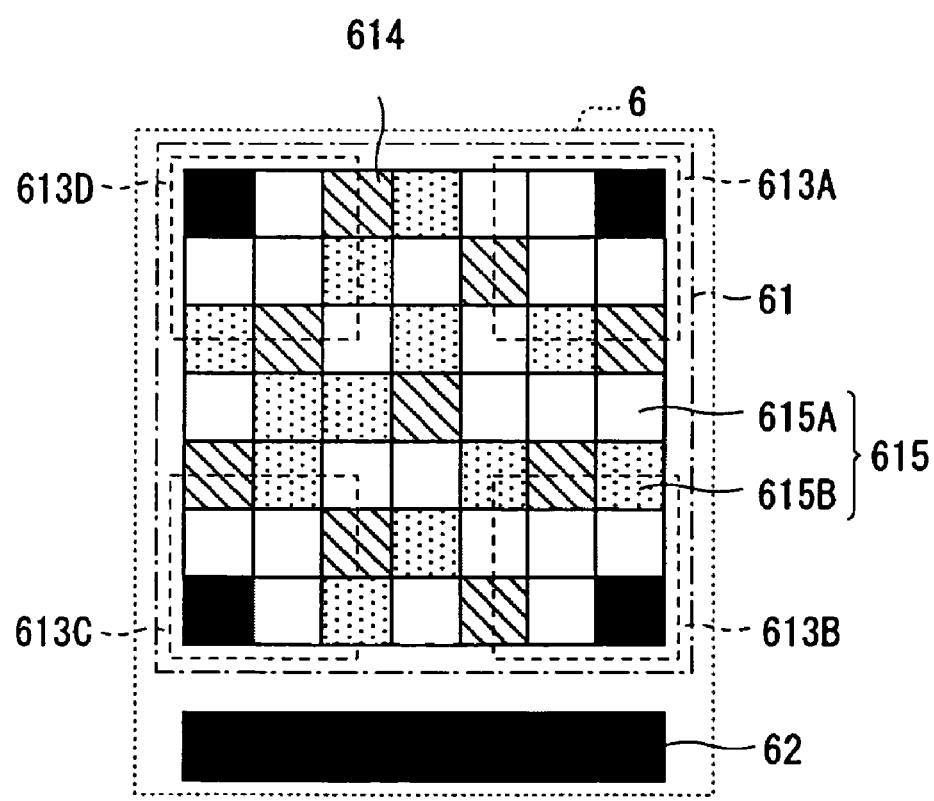

FIGS. 16A and 16B show an example of the shape of the symbol of the two-dimensional dynamic code and configurations and functions of each dot according to this modification, which corresponds to FIGS. 7A and 7B, and FIGS. 8A and 8B in the embodiment. FIG. 16A shows a shape of appearance of the symbol, and FIG. 16B shows configurations and functions of each dot in the symbol.

As shown in FIG. 16A, the shape of a symbol 6 of the two-dimensional dynamic code is composed of a code section 61 in which the total of 49 dots (7×7) are arranged, and a logo mark section 62 which is arranged under the code section 61.

As shown in FIG. 16B, 4 dot regions in the four corners in the code section 61 are respectively the areas for recognition 613A to 613D. Therefore, of the code section 61 composed of the total of 49 dots as above, 33 dots (49−4×4) are utilized as a given white and black pattern.

Further, of the 33 dots after excluding the areas for recognition 613A to 613D, 9 dots are utilized as bit for CRC 614. Therefore, the portion capable of being finally utilized as given data bit 615 is 24 dots (33−9=24). The data bit 615 of 24 dots includes normal rotation data bit 615A of 12 dots, half thereof, and inversion data bit 615B of 12 dots, the other half thereof.

Next, a data configuration in the symbol of the two-dimensional dynamic code according to this modification will be described.

FIGS. 17A and 17B show an example of a data configuration in the symbol of FIGS. 16A and 16B, which corresponds to FIGS. 9A, 9B, 9C, and 9D in the embodiment. FIG. 17A shows a distribution of the data configuration of the data region of 33 bits capable of being utilized as a given black and white pattern in the code section 61 as described above, and FIG. 17B shows a relation between values of the symbol ID and contents of the data region in the data for 33 bits.

As shown in FIG. 17A, a data configuration 63 in the given data region of 33 bits is configured to have the above mentioned bit for CRC 614 of 9 bits, a symbol ID 632 of 4 bits, and a data region 633 of 20 bits.

Further, as shown in FIG. 17B, according to the value of the symbol ID 632 of 4 bits, contents of the data region 633 are constructed as follows.

First, when the value of the symbol ID 632 is "1000b," the symbol functions as a start symbol 635 in the two-dimensional dynamic code. In this case, contents of the data region 633 are to define the all symbol number composing the two-dimensional dynamic code.

Further, when the value of the symbol ID 632 is "1001b" to 1111b," the symbol functions as a header symbol 636 in the two-dimensional dynamic code. When the value of the symbol ID 632 is "1001b" to 1110b," contents of the data region 633 are to define the file name in the two-dimensional dynamic code. When the value of the symbol ID 632 is "1111b," the file name is not defined. In this case, the data region 633 is not used.

Further, when the value of the symbol ID 632 is "0000b" to "0111b," the symbol functions as a data symbol 637 in the two-dimensional dynamic code. In this case, contents of the data region 633 are to show data information (contents data) in the two-dimensional dynamic code. The value of the symbol ID 632 in the data symbol 637 is periodically changed from "0000b" to "0111b." Each symbol can be differentiated up to for 8 symbols.

The maximum symbol number usable in the two-dimensional dynamic code according to this modification is (2 raised to the 20th power)=1 M symbols, since defined by the data region 633 of 20 bits in the start symbol 635 as described above. Since 20-bit data region is secured for every symbol as described above, the usable maximum data capacity becomes 1 M symbols ×20 bits=20 M bits=2.5 M bytes. Therefore, as in the format of the two-dimensional dynamic code shown in the embodiment, significantly large capacity of data can be utilized compared to in traditional barcodes or two-dimensional codes (about several K bytes at the maximum). Further, for example, where 1 symbol pattern is allocated to 1 frame, and the symbol pattern number per 1 sec is 60 (symbols/sec) with reference to NTSC method, the maximum data transfer rate is 60 (symbols/sec)×20 (bits/symbol)=1200 bps (bit/sec).

Next, processes that the display apparatus 1 acquires the symbol-transmission-receiving-status information SI and determines the display conditions DC by using the two-dimensional dynamic code composed of the single shaped format constructed as above similarly in the embodiment will be described.

In this case, as shown in FIG. 16B, all symbols of the two-dimensional dynamic code include the area for recognition 613. Therefore, as in the case of the synchronous symbol 51 and the anchor symbol 53 in the embodiment (Steps S304 to S305 and Steps S311 to S312 of FIG. 12), the display apparatus 1 can acquire and update the symbol-transmission-receiving-status information SI for every symbol by using the area for recognition 613. Therefore, as in the embodiment, the display conditions determination section 516 can determine the display conditions DC based on the symbol-transmission-receiving-status information SI, and the display apparatus 1 can display each symbol of the two-dimensional dynamic code based on the display conditions DC.

As above, according to the display apparatus, the communication system, and the communication method of this modification, each symbol of the two-dimensional dynamic code is composed of a single shaped format, and the symbol-transmission-receiving-status information SI is acquired for every symbol by using the area for recognition 613 included in each symbol. Therefore, in addition to the effects of the foregoing embodiment, the symbol-transmission-receiving-status information can be updated for receiving each symbol, and the format of the two-dimensional dynamic code can be simplified.

While the invention has been described with reference to the embodiment and the modifications, the invention is not limited thereto, and various modifications may be made. For example, in the foregoing embodiment and the like, the case where first, the input and output terminal 2 side sends transmission request of contents data to the display apparatus 1, and correspondingly, the display apparatus 1 transmits the contents data has been described. However, as long as display conditions DC are determined and the two-dimensional dynamic code based on the conditions is displayed on the display apparatus 1 side including the light-receiving-emitting section 11 whose region capable of displaying moving pictures and receiving light is wider than of the light-receiving-emitting section 21 of the input and output terminal 2, it is possible that on the contrary, first, the display apparatus 1 side performs processes to the input and output terminal 2. That is, as long as the display conditions DC are determined and display is performed based on the determined display conditions DC on the display apparatus 1 side including a wider light-receiving-emitting section, either apparatus can firstly perform processes.

Figure 18:
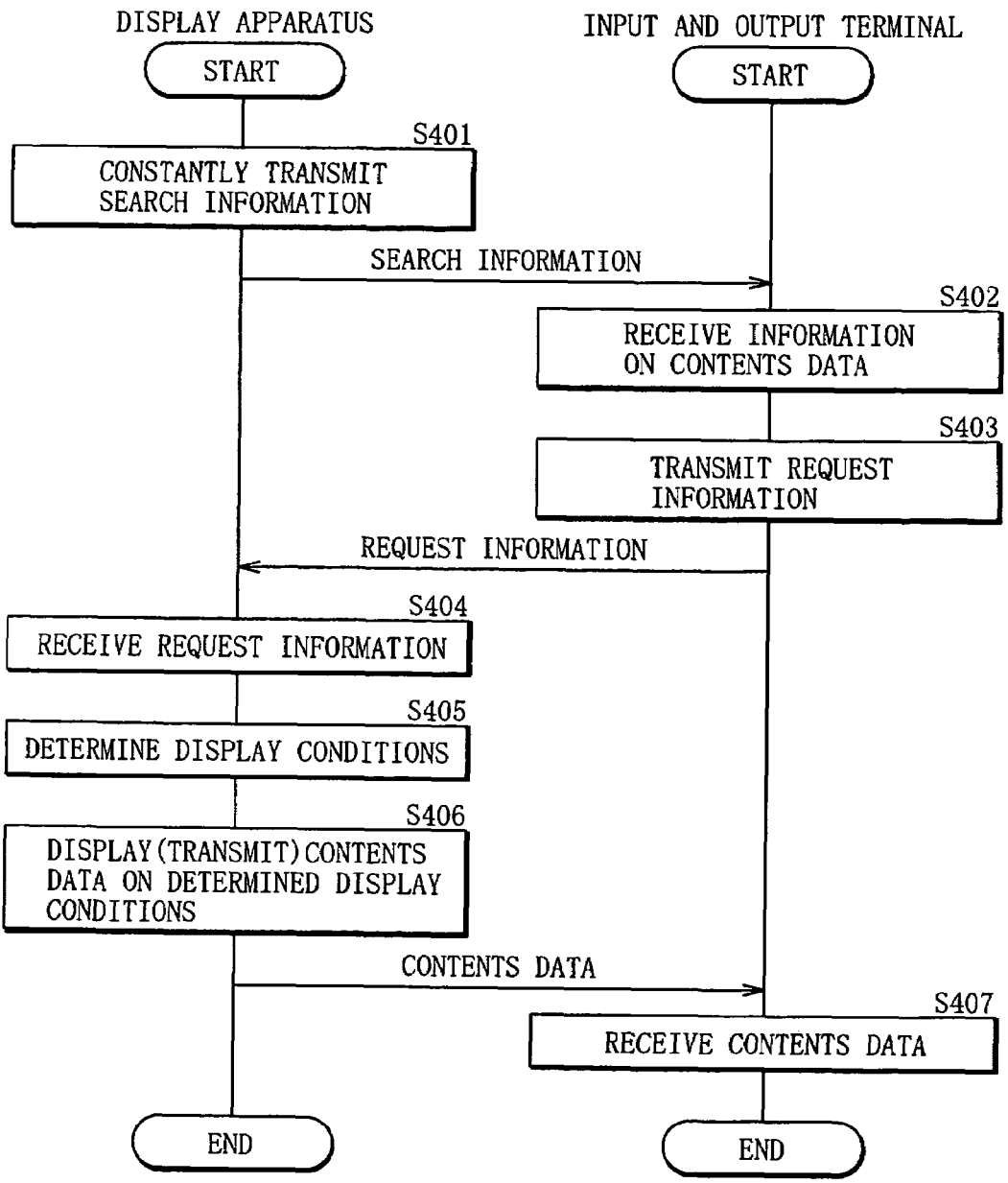
FIG. 18 is a flowchart showing other example of transmission and receiving processes of information between the display apparatus and the output terminal in the communication system of FIG. 1.

Specifically, as shown in FIG. 18, for example, first, the display apparatus 1 side constantly transmits by using the two-dimensional dynamic code, search information on contents data capable of being transmitted by using the two-dimensional dynamic code (for example, text information on the contents of the contents data, which can be transmitted by using the two-dimensional dynamic code though the image 121A is not displayed in the window 12A in FIG. 4) (Step S401). In this case, a user can receive index information on the contents data by using the two-dimensional dynamic code by approximating the light-receiving-emitting section 21 of the input and output terminal 2 to the light-receiving-emitting section 11 of the display apparatus 1 (Step S402). Here, when the user desires to receive the contents data as in Step S101 of FIG. 11, in this state, transmission request information of the contents data may be transmitted to the display apparatus 1 by using the two-dimensional dynamic code (Step S403). Since subsequent processes (Steps S404 to S407) are similar to of Steps S102 to S105 of FIG. 11, the descriptions thereof are omitted.

As above, when the display apparatus 1 side first performs processes, contents data can be surely transmitted and received as in the foregoing embodiment and the like as well.

It should be understood by those skilled in the art that various modifications, combinations, sub-combinations and alternations may occur depending on design requirements and other factors insofar as they are within the scope of the appended claims or the equivalents thereof.

What is claimed is:

1. A communication method performed between a first display apparatus comprising a first light-receiving-emitting screen capable of displaying moving pictures and receiving light and a second display apparatus comprising a second light-receiving-emitting screen capable of displaying moving pictures and receiving light by using a two-dimensional dynamic code which is a two-dimensional code changing along a time axis, wherein
    in the first display apparatus, a plurality of symbols composing the two-dimensional dynamic code are sequentially displayed on the first light-receiving-emitting screen along the time axis, and
    in the second display apparatus, the plurality of symbols are read by the second light-receiving-emitting screen, based on the read symbol, symbol-transmission-receiving-status information is acquired, the symbol-transmission-receiving-status information including at least one of information showing a relative angle between the second light-receiving-emitting screen and the first light-receiving-emitting screen, information showing a size of the symbol displayed on the first light-receiving-emitting screen, and information showing a light receiving position of the read symbol, based on the symbol-transmission-receiving-status information, at least one of display conditions is determined, the display conditions including a display angle, a size, and a display position of the symbol in displaying the two-dimensional dynamic code on the second light-receiving-emitting screen, and based on the determined display condition, the two-dimensional dynamic code is displayed on the second light-receiving-emitting screen.

2. A communication method according to claim 1, wherein each symbol configuring the two-dimensional dynamic code includes a plurality of reference elements, and in the second display apparatus, the symbol-transmission-receiving-status information is acquired based on a light receiving position of the reference element in each symbol.

3. A communication method according to claim 1, wherein in the second display apparatus, the display conditions are determined by considering flexibility of position deviance from the light receiving position of the symbol read by the second light-receiving-emitting screen.

4. A communication method according to claim 1, wherein in the second display apparatus, the display conditions are determined by considering flexibility of angle deviance from the relative angle between the second light-receiving-emitting screen and the first light-receiving-emitting screen.

5. A communication method according to claim 1, wherein the plurality of symbols include a data symbol which is a two-dimensional code expressed by a format for data transmission and an anchor symbol which is a two-dimensional code expressed by a format for anchor transmission,
    in the first display apparatus, the data symbol is displayed on the first light-receiving-emitting screen along the time axis, and the anchor symbol is displayed on the first light-receiving-emitting screen every time the data symbol is displayed once or a plurality of times, and
    in the second display apparatus, the data symbol and the anchor symbol are read by the second light-receiving-emitting screen, while the anchor symbol is therefrom detected, and the symbol-transmission-receiving-status information is acquired based on the detected anchor symbol.

6. A communication method according to claim 5, wherein the format for anchor transmission is configured so that the anchor symbol includes a plurality of reference elements, and
    in the second display apparatus, the symbol-transmission-receiving-status information is acquired based on the light receiving position of the reference element in the anchor symbol.

7. A first display apparatus, which communicates with a second display apparatus, said second display apparatus comprising a first light-receiving-emitting screen capable of displaying moving pictures and receiving light by using a two-dimensional dynamic code which is a two-dimensional code changing along a time axis said first display apparatus, comprising:
    a second light-receiving-emitting screen capable of displaying moving pictures and receiving light;
    a reading control means for reading a plurality of symbols composing the two-dimensional dynamic code displayed on the first light-receiving-emitting screen from the first light-receiving-emitting screen of the first display apparatus by using the second light-receiving-emitting screen;
    an acquisition means for acquiring symbol-transmission-receiving-status information including at least one of information showing a relative angle between the second light-receiving-emitting screen and the first light-receiving-emitting screen, information showing a size of the symbol shown on the first light-receiving-emitting screen, and information showing a light receiving position of the symbol read by the reading control means, based on the symbol read by the reading control means;
    a determination means for determining at least one display condition of a display angle, a size, and a display position of the symbol in displaying the two-dimensional dynamic code on the second light-receiving-emitting screen based on the symbol-transmission-receiving-status information acquired by the acquisition means;
    a generation means for generating two-dimensional dynamic code including a plurality of symbols; and a display control means for sequentially displaying the plurality of symbols in the two-dimensional dynamic code generated by the generation means along the time axis on the second light-receiving-emitting screen based on the display conditions determined by the determination means.

8. The first display apparatus according to claim 7, wherein in the first display apparatus, when each symbol composing the two-dimensional dynamic code includes a plurality of reference elements, the acquisition means acquires the symbol-transmission-receiving-status information based on the light receiving position of the reference element in each symbol.

9. The first display apparatus according to claim 7, wherein the determination means determines the display conditions by considering flexibility of position deviance from the light receiving position of the symbol read by the reading control means.

10. The first display apparatus according to claim 7, wherein the determination means determines the display conditions by considering flexibility of angle deviance from the relative angle between the second light-receiving-emitting screen and the first light-receiving-emitting screen.

11. The first display apparatus according to claim 7, wherein the light-receiving-emitting device composing the second light-receiving-emitting screen is an organic EL device.

12. The first A display apparatus according to claim 7, wherein the reading control means reads a two-dimensional dynamic code including a plurality of symbols, the symbols including a data symbol which is a two-dimensional code expressed by a format for data transmission and an anchor symbol which is a two-dimensional code expressed by a format for anchor transmission, and
the acquisition means detects an anchor symbol from the symbol read by the reading control means, and acquires the symbol-transmission-receiving-status information based on the detected anchor symbol.

13. The first display apparatus according to claim 12, wherein in the first display apparatus, when the format for anchor transmission is configured so that the anchor symbol includes a plurality of reference elements, the acquisition means acquires the symbol-transmission-receiving-status information based on the light receiving position of the reference element in the anchor symbol.

14. A communication system including two display apparatuses and performing communication by using a two-dimensional dynamic code which is a two-dimensional code changing along a time axis, wherein
a first display apparatus comprises:
a first light-receiving-emitting screen capable of displaying moving pictures and receiving light;
a first generation means for generating the two-dimensional dynamic code including a plurality of symbols; and
a first display control means for sequentially displaying the plurality of symbols in the two-dimensional dynamic code generated by the first generation means along the time axis on the first light-receiving-emitting screen, and wherein
a second display apparatus comprises:
a second light-receiving-emitting screen capable of displaying moving pictures and receiving light;
a reading control means for reading the plurality of symbols composing the two-dimensional dynamic code displayed on the first light-receiving-emitting screen from the first light-receiving-emitting screen of the first display apparatus by using the second light-receiving-emitting screen;
an acquisition means for acquiring symbol-transmission-receiving-status information including at least one of information showing a relative angle between the second light-receiving-emitting screen and the first light-receiving-emitting screen, information showing a size of the symbol shown on the first light-receiving-emitting screen, and information showing a light receiving position of the read symbol based on the symbol read by the reading control means;
a determination means for determining at least one display condition of a display angle, a size, and a display position of the symbol in displaying the two-dimensional dynamic code on the second light-receiving-emitting screen based on the symbol-transmission-receiving-status information acquired by the acquisition means;
a second generation means for generating the two-dimensional dynamic code including a plurality of symbols; and
a second display control means for sequentially displaying the plurality of symbols in the two-dimensional dynamic code generated by the second generation means along the time axis on the second light-receiving-emitting screen based on the display conditions determined by the determination means.

15. A first display apparatus, which communicates with a second display apparatus, said second display apparatus comprising a first light-receiving-emitting screen capable of displaying moving pictures and receiving light by using a two-dimensional dynamic code which is a two-dimensional code changing along a time axis said first display apparatus, comprising:
a second light-receiving-emitting screen capable of displaying moving pictures and receiving light;
a reading control section reading a plurality of symbols composing the two-dimensional dynamic code displayed on the first light-receiving-emitting screen from the first light-receiving-emitting screen of the first display apparatus by using the second light-receiving-emitting screen;
an acquisition section acquiring symbol-transmission-receiving-status information including at least one of information showing a relative angle between the second light-receiving-emitting screen and the first light-receiving-emitting screen, information showing a size of the symbol shown on the first light-receiving-emitting screen, and information showing a light receiving position of the symbol read by the reading control section, based on the symbol read by the reading control section;
a determination section determining at least one display condition of a display angle, a size, and a display position of the symbol in displaying the two-dimensional dynamic code on the second light-receiving-emitting screen based on the symbol-transmission-receiving-status information acquired by the acquisition section;
a generation section generating two-dimensional dynamic code including a plurality of symbols; and
a display control section sequentially displaying the plurality of symbols in the two-dimensional dynamic code generated by the generation section along the time axis on the second light-receiving-emitting screen based on the display conditions determined by the determination section.

* * * * *